United States Patent

Kawasaki et al.

[11] Patent Number: 5,964,991
[45] Date of Patent: Oct. 12, 1999

[54] SINTERED LAMINATED STRUCTURES, ELECTROCHEMICAL CELLS AND PROCESS FOR PRODUCING SUCH SINTERED LAMINATED STRUCTURES

[75] Inventors: Shinji Kawasaki, Nagoya; Shigenori Ito; Kiyoshi Okumura, both of Kasugai, all of Japan

[73] Assignee: NGK Insulators, Ltd., Japan

[21] Appl. No.: 08/936,615

[22] Filed: Sep. 24, 1997

[30] Foreign Application Priority Data

| Sep. 26, 1996 | [JP] | Japan | 8-254412 |
| Jan. 8, 1997 | [JP] | Japan | 9-001245 |
| May 8, 1997 | [JP] | Japan | 9-118061 |

[51] Int. Cl.$^6$ ................................................ C25B 13/00
[52] U.S. Cl. .................. 204/282; 204/252; 429/30; 429/36; 429/44; 429/45; 29/623.3; 210/510.1; 428/131; 428/312.2; 428/312.6; 428/698; 428/701; 428/702; 55/342; 55/350.1; 55/401; 55/410; 55/484; 55/486; 55/523
[58] Field of Search ....................... 204/290 R, 421, 204/252, 295, 282; 429/30, 36, 44, 45; 29/623.3; 210/510.1; 428/131, 312.2, 312.6, 6, 98, 701, 702; 55/342, 350.1, 401, 410, 484, 486, 523

[56] References Cited

U.S. PATENT DOCUMENTS

| 4,364,760 | 12/1982 | Higuchi et al. | 210/510.1 |
| 4,695,301 | 9/1987 | Okajima et al. | 210/510.1 |
| 5,034,023 | 7/1991 | Thompson | 205/634 |
| 5,198,007 | 3/1993 | Moyer et al. | 210/510.1 |
| 5,549,725 | 8/1996 | Kasai et al. | 210/510.1 |
| 5,855,781 | 1/1999 | Yorita et al. | 210/510.1 |

FOREIGN PATENT DOCUMENTS

| 5-54897 | 3/1993 | Japan . |
| 6-68885 | 3/1994 | Japan . |

Primary Examiner—Bruce F. Bell
Attorney, Agent, or Firm—Parkhurst & Wendel, L.L.P

[57] ABSTRACT

A sintered laminated structure including a plurality of ceramic layers made of ceramic materials different from one another, wherein each of the ceramic layers is provided with through-holes passing each of the ceramic layers.

19 Claims, 14 Drawing Sheets

FIG_1
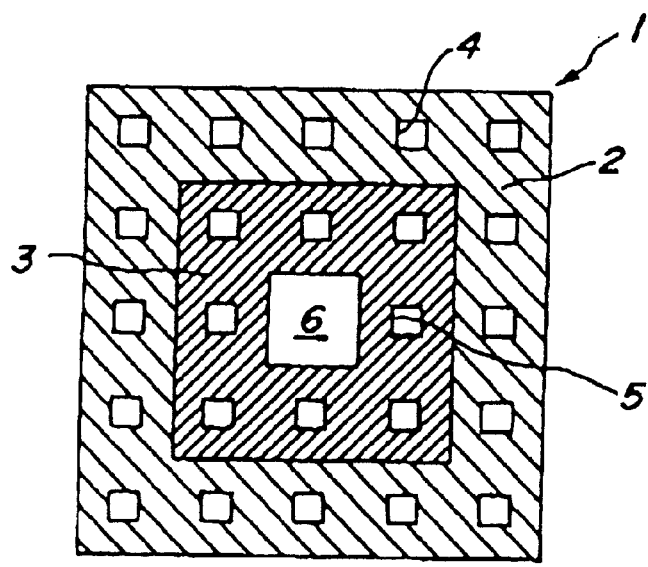
FIG_2
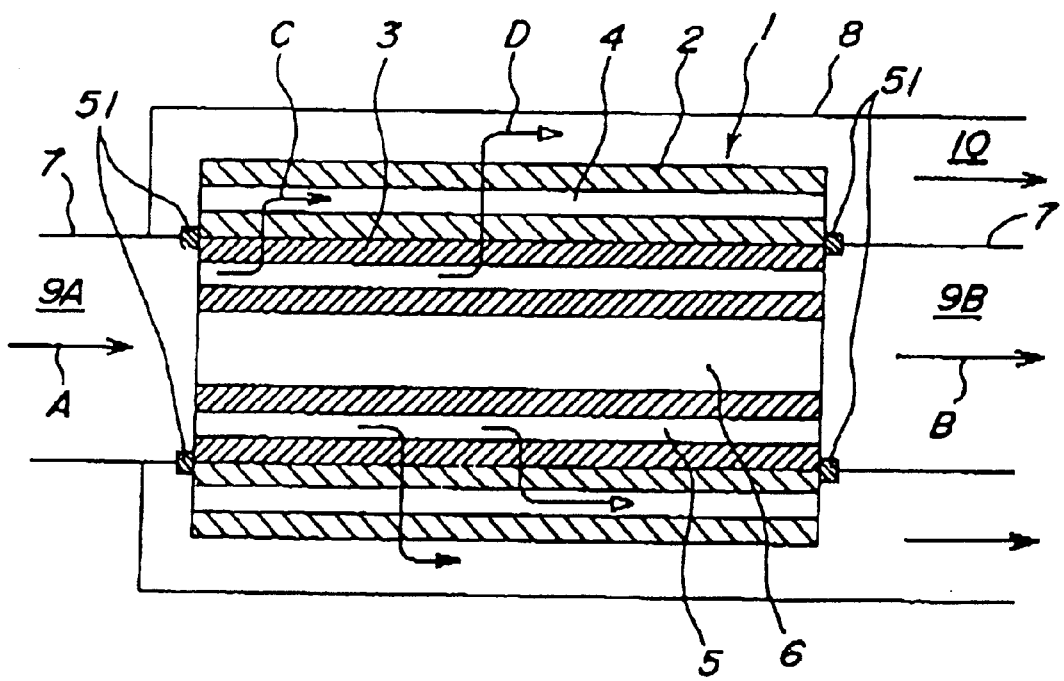

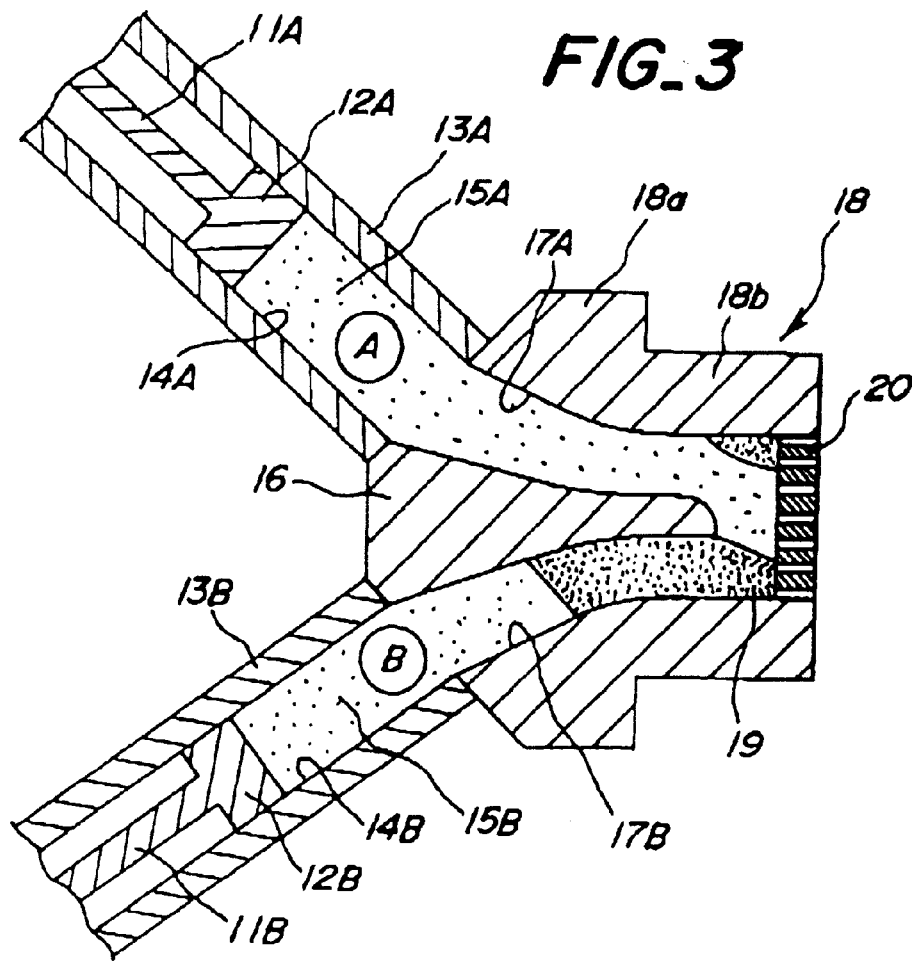
FIG_3
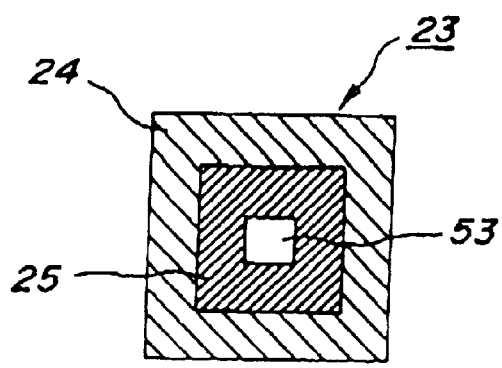
FIG_4

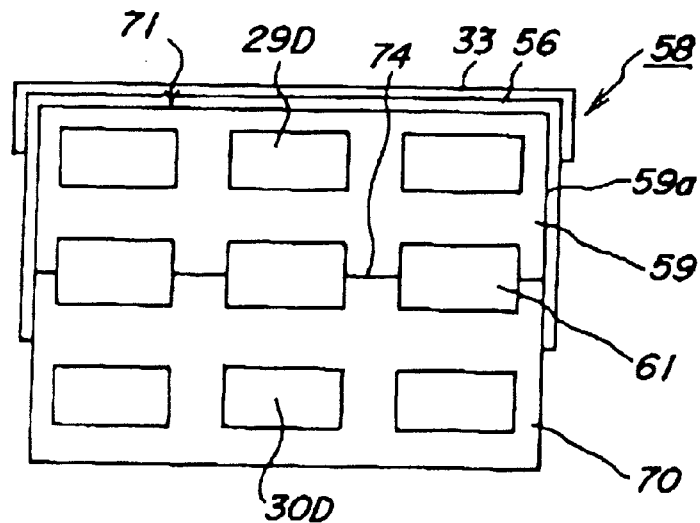
FIG_7
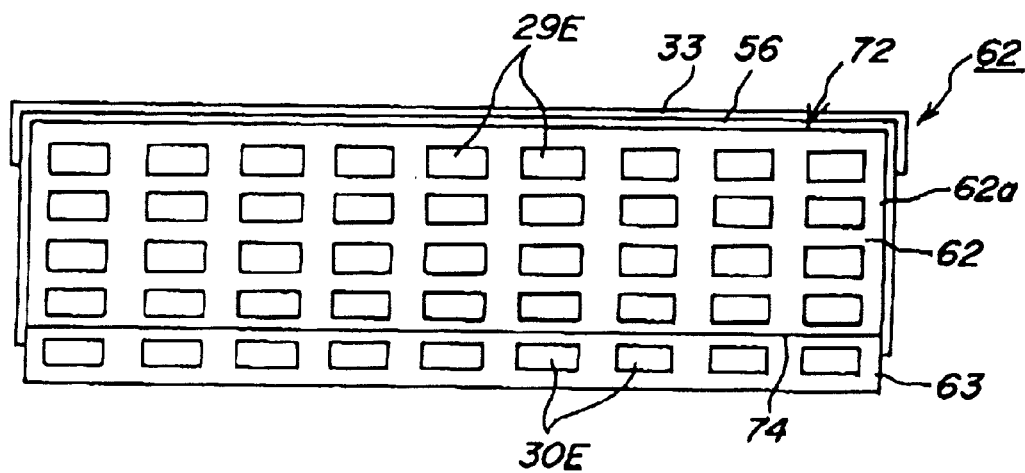
FIG_8

FIG_9a
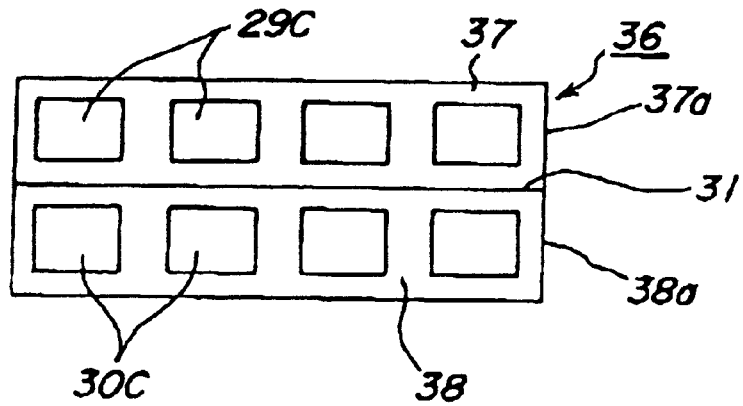
FIG_9b
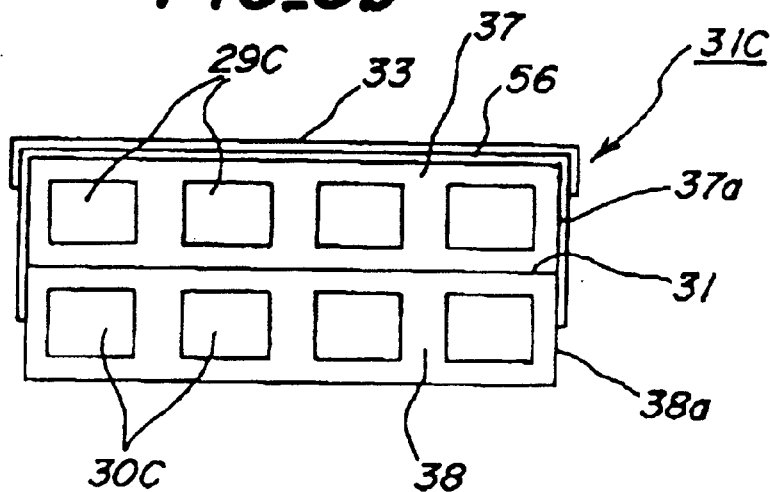
FIG_9c
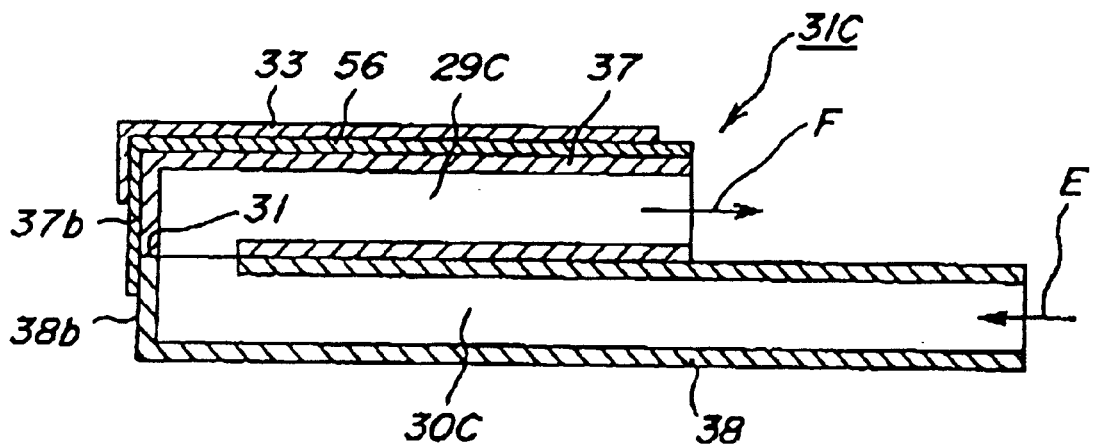

FIG_11

FIG_12

FIG_13

FIG_14

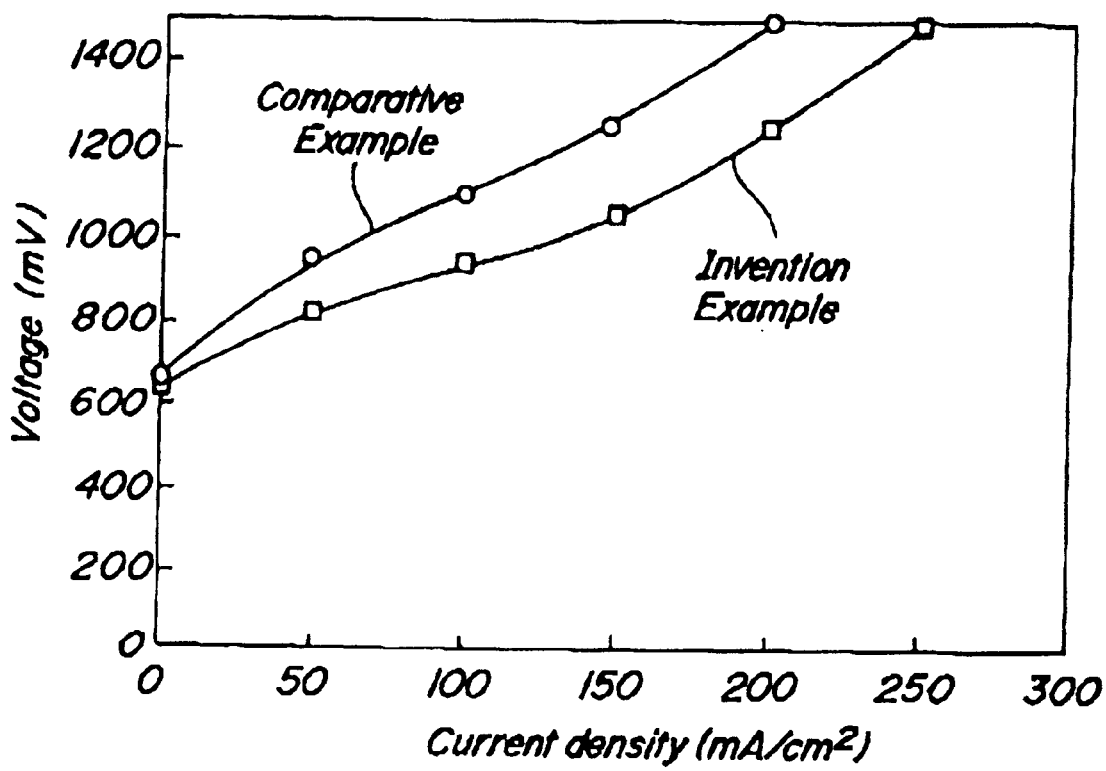
FIG_19

SINTERED LAMINATED STRUCTURES, ELECTROCHEMICAL CELLS AND PROCESS FOR PRODUCING SUCH SINTERED LAMINATED STRUCTURES

BACKGROUND OF THE INVENTION (1-0001)

(1) Field of the Invention

A first aspect of the present invention relates to a sintered laminated structure including a plurality of ceramic layers made of different materials, which sintered laminated structure is useful as a filter as well as a laminated structure for electrochemical cells such as solid oxide fuel cells, steam electrolysis cells, oxygen pumps, and NOx decomposition cells. The invention also relates to a process for producing such a sintered laminated structure, and to an electrochemical cell using such a sintered laminated structure.

(2-0001)

A second aspect of the present invention relates to a self-supporting type substrate for an electrochemical cell, a process for producing the substrate for the electrochemical cell, and such an electrochemical cell, said electrochemical cell including the self-supporting type electrode substrate and adapted to be used as a solid oxide fuel cell, a steam electrolysis cell, an oxygen pump, or a NOx decomposing cell or the like.

(2) Related Art Statement (1-0002)

Heretofore, ceramic filters have been used in various technical fields including treatment of water. Among such filters, for example, a filter in which a ceramic layer having fine pores is formed on the surface of a cylindrical porous ceramic main body is known.

(1-0003)

The solid oxide fuel cells are broadly classified into a planar type and a tubular type. In the solid oxide fuel cell of the planar type, a power generating stack is formed by alternatively laminating so-called separators and power-generating layers. In JP-A 5-54897, a fuel electrode and an air electrode are separately formed, a power-generating layer is produced by using these fuel electrode and air electrode, an interconnector is formed, and a laminated body is produced by interposing a thin film containing ceramic powder and an organic binder between the power-generating layer and the interconnector.

(1-0004)

In JP-A 6-68885, a green molded body of an interconnector and that of a distributor on a side of an air electrode are laminated together, and the interconnector and the distributor are joined together by integrally firing the resulting laminate. According to this process, a stress-relaxation layer is formed between the green molded bodies by applying such a material between them as extremely differs from the green bodies in terms of the thermal shrinkage behavior so that stress between the green molded bodies may be relaxed by the stress-relaxation layer. The above stress-relaxation layer is finely broken during firing shrinkage, which relaxes the stress.

(1-0005)

Both of a principal portion of the solid oxide fuel cell and the ceramic filter is a member obtained by laminating ceramic layers and integrally the laminate. However, they have the following common problems. That is, as to the ceramic filter, the entire dimension of the filter needs to be made greater to enhance the filtration efficiency. This causes a cost-up and increase in the installation space. Furthermore, since the filter is made of bulky ceramics, the filter has a large weight. Furthermore, in order to decrease the filtration resistance of the filter, the thickness of the filter needs to be thin. In order to decrease the filtering resistance of the filter, the thickness of the filter needs to be decreased. This unfavorably largely deteriorates the strength of the structural body of the filter.

(1-0006)

On the other hand, according to the solid oxide fuel cell, a gas cannot be fed to the electrode at good efficiency, that is, resistance against diffusion of the gas inside the electrode is large, so that there is a certain limit upon the power-generating performance of the cell. Further, there are problems that a unit cell is heavy and a material cost is high because a rare earth element is used.

(2-0002)

In the solid oxide fuel cell, it is a common technique that an electrode or an interconnector is designed in the form of a substrate to give strength, and that constituting elements (a solid electrolyte and the other electrode) other than the substrate are formed on the substrate in a filmy fashion to reduce resistance of the cell. For example, according to a solid oxide fuel cell of a so-called Westinghouse type, a tubular air electrode is used as a substrate, and a film of a solid electrolyte and a film of a fuel electrode are formed on this substrate. NGK Insulators, Ltd. also disclosed a unit cell having a structure in which a sintered laminated structure composed of an air electrode and an interconnector is used as an air electrode/interconnector substrate, and a film of a solid electrolyte and a film of a fuel electrode are formed on the substrate (JP-A-5-66518).

(2-0003)

However, since a collective cell is formed by laminating a number of planar or tubular unit cells, given mechanical strength is required for such unit cells. In the conventional unit cells, since the electrode is used as a substrate, it is indispensable that the substrate has a large thickness of around 3 mm to around 10 mm to afford given mechanical strength upon the substrate. For this reason, there exist problems in that the substrate is heavy and the cost for materials to constitute the substrate is high. Further, since the substrate is thick, an internal resistance of the substrate is large. Electric power is generated at a three-phase interfaces at which electrodes, pores and a solid electrolyte contact together. Since the substrate is thick, diffusing resistance at which a gas diffuses in the substrate is large, and polarization is great. Consequently, this leads to reduction in the electric power-generating performance. Furthermore, it has been clarified that similar problems exist in the case of an electrochemical cell other than the solid oxide fuel cell, for example, a high temperature steam electrolysis cell.

(1-0007)

SUMMARY OF THE INVENTION

It is therefore an object of the first aspect of the present invention to provide a sintered laminated functional ceramic structure for use as a ceramic filter or for a solid oxide fuel cell, in which functions possessed by ceramics can be enhanced, the weight of the sintered laminated structure is reduced and the structural strength of the sintered laminated structure is increased. The present invention also relates to a process for producing such a sintered laminated structure as well as to an electrochemical cell using such a sintered laminated structure.

(1-0008)

The first aspect of the present invention relates to the sintered laminated structure comprising a plurality of ceramic layers being made of ceramic materials different from one another, wherein each of the cerainic layers is provided with through-holes passing said each of the ceramic layers.

(1-0009)

The present inventors reached a new structure that the independent through-holes are formed in each of the ceramic layers constituting the sintered laminated structure. As a result, the functions possessed by the ceramic materials can be enhanced, the weight of the sintered laminated structure can be reduced, and the structural strength of the sintered laminated structure can be improved.

(1-0010)

More specifically, when the sintered laminated structure is used as a ceramic filter for a filtering device, filtering resistance is small, filtering efficiency is improved, and a large amount of liquid can be treated in a short time. Further, the weight of the filter can be reduced by the provision of the through-holes. Since the independent or closed through-holes are formed in each of the ceramic layers, the structural strength can be kept high.

(1-0011)

On the other hand, when the sintered laminated structure is a sintered laminated structure having a planar shape for an electrochemical cell and is provided with an electrode layer and a separator layer, the gas-diffusing efficiency inside the electrode can be enhanced and the electrode reaction can be activated by the provision of the through-holes in the electrode layer. As a result, in the case of the solid oxide fuel cell, the power-generating density is enhanced. In the case of the steam electrolysis cell, electrolysis efficiency is improved. In addition, the cooling effect of the cell can be improved and the temperature of the cell can be made uniform by the provision of the through-holes in the separator. Furthermore, the cell can be made lighter by the through-holes without deteriorating the strength of the structure.

(2-0004)

It is an object of the second aspect of the present invention to ultimately provide an electrochemical cell comprising a self-supporting type substrate constituting one of electrodes of the electrochemical cell, a film of a solid electrolyte formed on the substrate, and the other electrode formed on the solid electrolyte film, wherein the internal resistance and polarization of the electrodes are decreased to realize both improvement of the mechanical strength of the cell and reduction in its weight.

(2-0005)

The second aspect of the present invention relates to a self-supporting type substrate for an electrochemical cell, said substrate comprising at least one of electrodes of the electrochemical cell and having a honeycomb ceramic structure, said honeycomb ceramic structure comprising a wall portion on which a film of a solid electrolyte is to be formed, and said wall portion having a thickness of 0.5 mm or less.

(2-0006)

The second aspect of the present invention also relates to an electrochemical cell comprising the above substrate, a film of a solid electrolyte formed on this substrate, and the other electrode formed on the film of the solid electrolyte.

(2-0007)

The second aspect of the present invention also relates to a process for producing a self-supporting type substrate for an electrochemical cell, said process comprising the steps of preparing a first body for forming a ceramic layer to constitute one of electrodes of the electrochemical cell and a second body for forming another ceramic layer to constitute an interconnector, forming a molded body by simultaneously feeding said first and second bodies into a die to form a honeycomb ceramic structure, and firing the molded body, wherein said substrate comprises at least one of electrodes of the electrochemical cell and having the honeycomb ceramic structure, said honeycomb ceramic structure comprises said at least one of the electrodes and an interconnector as well as a wall portion on which a film of a solid electrolyte is to be formed, and said wall portion having a thickness of 0.5 mm or less.

(2-0008)

The present inventors reached a technical idea that the electrode substrate was formed by a honeycomb ceramic structure, actually produced unit cells and conducted electric power-generating tests for them. As a result, even if the thickness of the walls of the honeycomb ceramic structure is made smaller, given mechanical strength of the honeycomb structure can be maintained, and the weight of the unit cell can be reduced. Further, the internal resistance in the electrodes can be reduced, gases can be fed to a reaction site at higher efficiency, and polarization can be reduced. Thereby, electri cpower-generating performance per unit cell can be further improved. The present inventors reached the present invention based on the above confirmation.

(2-0009)

In the present invention, the substrate can be constituted by only at least one of the electrodes, but the substrate may be constituted as a laminate of at least one of the electrode and the interconnector.

(2-0010)

The electrochemical cell according to the second aspect of the present invention may be used as an oxygen pump. Further, the electrochemical cell according to the second aspect of the present invention may be used as a high temperature steam electrolysis cell, or in a hydrogen producing apparatus or a steam removing apparatus. In the latter case, the electrode reactions mentioned before occur. (See (1-0023))

(2-0012)

Furthermore, the electrochemical cell according to the second aspect of the present invention may be used as an NOx decomposing cell. What have been described in connection with the use of the electrochemical cell according to the first aspect of the present invention as the NOx decomposing cell may be applied to that according to the second aspect of the present invention (See (1-0024) and (1-0025)).

BRIEF DESCRIPTION OF THE DRAWINGS

For a better understanding of the invention, reference is made to the attached drawings, wherein:

FIG. 1 is a sectional view for illustrating a ceramic filter 1;

FIG. 2 is a partially sectional view for outlining a state in which the filter of FIG. 1 is set in a filtering device;

FIG. 3 is a schematic view for illustrating a state in which a laminated body is extruded by simultaneously feeding a body 15A and another body 15B into a single extruding die 18;

FIG. 4 is a front view for outlining a filter as a comparative example;

FIG. 7 is a front view for outlining an electrochemical cell 58 as a still further embodiment of the present invention;

FIG. 8 is a front view for outlining an electrochemical cell 62 as a still further embodiment of the present invention;

FIG. 9(a) is a front view for illustrating a sintered laminated structure for an electrochemical cell as a still further embodiment, FIG. 9(b) is a front view for illustrating a cell 31C, and FIG. 9(c) is a sectional view of the cell 31C;

FIG. 19 is a graph showing the voltage-current density characteristic of high temperature steam electrolysis cells as an invention example and a comparative example.

DETAILED DESCRIPTION OF THE INVENTION (1-0012)

Figure 5A:
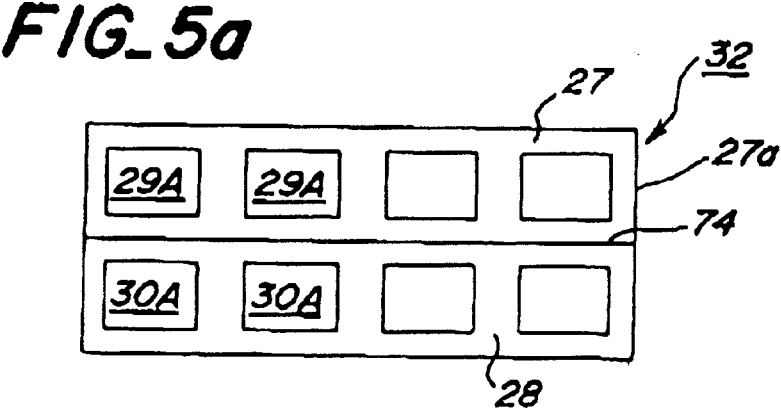
FIG. 5($a$) is a front view for outlining a sintered laminated structure 32 for an electrochemical cell as another embodiment of the present invention, and FIG. 5($b$) is a front view for illustrating a cell 31A.

In the following, more specific embodiments of the first aspect of the present invention will be explained.

The sintered laminated structure is preferably in an elongate shape. More specifically, the longitudinal length of the through-hole is set at preferably not less than 2 times, more preferably not less than 5 times as large as that of the through-hole in a direction vertical to the through-hole.

(1-0013)

A process for producing the sintered laminated structure according to the present invention is not limited to any specific one. However, a molded body for the above sintered laminated structure can be produced by obtaining a molded body through simultaneously feeding bodies for respective ceramic layers to a die and integrally firing the molded body.

(1-0014)

According to the above producing process, laminated structures having various sectional shapes can be produced by changing the configuration of the die. Further, an elongate product (for example, 1000 mm in length) can be produced. In this process, the number of the producing steps can be largely reduced.

(1-0015)

If the shape of an inlet is designed to be circular, the die can be easily worked. The shape of the inlet of the die is appropriately designed so that the bodies may easily proceed in the die. As an extruding mechanism for extruding each of the die in the die, a plunger or a vacuum pug mill may be used.

(1-0016)

If an aqueous binder is used in the body, it needs not be deaerated unlike in the use of an organic solvent. Accordingly, the producing equipment may be simplified, and the molded body extruded from the die is unlikely to be bent. In this case, the content of water in the body is preferably in a range of 10 to 20 wt %. Further, as the aqueous binder, polyvinyl alcohol, methyl cellulose and ethyl cellulose may be recited.

(1-0017)

Further, it turned out that the molded body is likely to be bent in extruding the molded body. That is, the flowing speed of the harder body tends to be smaller on extruding, whereas that of the softer body tends to be larger. Due to this difference in the flowing speed, the molded body was bent or warped as the molded body goes away from the tip of the molded body. Further, due to the above difference in the flowing speed between the bodies, the interface between them was positionally deviated.

(1-0018)

On the other hand, it turned out that hardness of a body preferably differs from that of an adjacent one by not more than 2 so that the molded body may not be bent, the molded body may be straightly extruded, and the interface of the adjacent green molded bodies may not positionally deviated. Hardness referred to here is hardness measured by a standard set for a NGK clay hardness meter.

(1-0019)

It is often difficult to finely adjust the hardness of actual bodies in an actual producing process. In order to continuously feed each body into a single die, it is possible that a body to constitute a first green molded body is pushed to the die from a first extruding mechanism, and another body to constitute an adjacent green molding body is pushed to the die from a second extruding mechanism. Thereby, it is possible that the extruding speed and the extruding pressure of each of the bodies through the first and second extruding mechanisms are mechanically appropriately adjusted so that the laminated body may be prevented from being bent.

(1-0020)

In the present invention, in case of a filter where a liquid is fed to an inner layer and a filtered liquid is discharged from an outer layer, silica, alumina, mullite, zirconia, spinel, silicon carbide, and cordierite may be recited as a material for constituting the outer layer of the filter. The average pore diameter is preferably 1 to 10 μm, and the porosity is preferably 10 to 70%. As a material for constituting the inner layer of the filter, silica, alumina, mullite, zirconia, spinel, silicon carbide, and cordierite may be recited. The material of the inner layer may be identical with or different from that of the outer layer. The average pore diameter of the inner layer is preferably 5 to 200 μm. In this case, the average pore diameter of the inner layer is greater than that of the outer layer. The porosity of the inner layer is preferably 20 to 80%. In the above, if the construction is reversed between the inner layer and the outer layer, the liquid can be fed to the outer layer side, whereas the filtered liquid can be discharged from the inner layer side.

(1-0021)

As the electrochemical cell to which the present invention may be applied, an oxygen pump may be recited.

(1-0022)

This cell may be used for a hydrogen-producing apparatus or a steam-removing apparatus. In that case, the following reactions occur in each electrode.

(1-0023)

Cathode: $H_2O + 2e^- \rightarrow H_2 + O^{2-}$
Anode: $O^{2-} \rightarrow 2e^- + \frac{1}{2} O_2$ (1-0024)

Further, the present invention may be applied to the NOx decomposing cell. This decomposing cell may be used as a purifier for exhaust gases from automobiles and power generating apparatuses. At present, NOx generated from gasoline engines is now being coped with by means of ternary functional catalysts. However, with respect to low fuel consumption type engines such as lean burning engines or diesel engines, the ternary function catalyst will not work well because the content of oxygen in the exhaust gases from these engines is large.

(1-0025)

If the electrochemical cell according to the present invention is used as an NOx decomposing cell, oxygen in the exhaust gas is removed through a solid oxide electrolyte film, NOx is decomposed into $N_2$ and $O^{2-}$ through electrolysis, and oxygen thus produced by the decomposition can be also removed. Further, concurrently with the above process, steam in the exhaust gases is electrolyzed into hydrogen and oxygen, and NOx is reduced into $N_2$ with this hydrogen.

(1-0026)

In the electrochemical cell according to the present invention, both an anode such as an air electrode and a cathode such as a fuel electrode may be included in an electrode to be integrated with a separator, but the anode is preferred. In addition, it is particularly favorable to join a self-supporting type anode to the separator. For, when a laminate composed of green molded bodies of the anode and the separator is to be formed, the laminate of the self-supporting anode and the separator is thicker and stronger, which makes handling easier.

(1-0027)

A main starting component for the separator is preferably a perovskite type complex oxide containing lanthanum, more preferably lanthanum chromite, because the latter has heat resistance, oxidation resistance, and reduction resistance. Moreover, a body for the formation of the green body of the separator may be produced by mixing an organic binder and water into the above-mentioned main raw component. As the organic binder, polymethyl acrylate, nitrocellulose, polyvinyl alcohol, methyl cellulose, ethyl cellulose, starch, wax, acrylic acid polymer, methacrylic acid polymer, etc. may be recited. When the weight of the main raw component is taken as 100, an addition amount of the organic binder is preferably 0.5 to 5 parts by weight.

(1-0028)

The main raw component for the anode is preferably a perovskite type complex oxide containing lanthanum, more preferably lanthanum manganite or lanthanum cobaltite, most preferably lanthanum manganite. Lanthanum chromite is preferred as the main raw material for the separator as mentioned above. Lanthanum chromite and lanthanum manganite may be doped with strontium, calcium or chromium (in the case of lanthanum chromite) or cobalt, iron, nickel, aluminum or the like. Palladium, platinum, ruthenium, platinum-zirconia mixed powder, palladium-zirconia mixed powder, ruthenium-zirconia mixed powder, platinum-cerium oxide mixed powder, palladium-cerium oxide mixed powder, ruthenium-cerium oxide mixed powder may be employed.

(1-0029)

As the main raw component for the cathode is preferably nickel, palladium, platinum, nickel-zirconia mixed powder, platinum-zirconia mixed powder, palladium-zirconia mixed powder, nickel-cerium oxide mixed powder, platinum-cerium oxide mixed powder, palladium-cerium oxide mixed powder, ruthenium, ruthenium-zirconia mixed powder or like.

(1-0030)

As the material for the solid electrolyte film, yttria-stabilized zirconia or yttria partially stabilized zirconia is preferred, but other material may be used.

(1-0031)

In the case of NOx decomposing cell, the solid electrolyte is particularly preferably made of cerium oxide-based ceramics, and the material for the cathode is preferably palladium, palladium-cerium oxide cermet.

(1-0032)

A body for the formation of the molded body of the electrode may be obtained by mixing an organic binder and water into the main raw component into the main raw component for the electrode. As this organic binder, those recited above for the separator may be recited. When the weight of the main raw component is taken as 100, an addition amount of the organic binder is preferably 0.5 to 5 parts by weight.

(1-0033)

The laminated molded body may be dewaxed separately from the firing, but the laminated molded body is preferably dewaxed during increase in temperature on firing. As to the laminated molded body for the solid oxide fuel cell, the firing temperature is ordinarily 1300° C. to 1700° C.

(1-0034)

EXPERIMENT 1-1

In the following, one embodiment of the present invention will be explained in more detail with reference to the drawings. FIG. 1 is a sectional view illustrating a ceramic filter 1. FIG. 2 is a partial sectional view for outlining the state in which the filter in FIG. 1 is placed in a filtering device. The filter shown in FIG. 1 was produced according to the following steps, and its performance was evaluated.

(1-0035)

Preparation of a Starting Material

First, a body was prepared by using alumina powder, cellulose and methyl cellulose. More specifically, 5 parts by weight of cellulose, 3 parts by weight of ethyl cellulose and 20 parts by weight of water were mixed into 100 parts by weight of alumina starting material powder, and a kneaded product was formulated by placing the resulting mixture into a kneader and kneading it. The kneaded product was placed in a vacuum pug mill where a cylindrial body A having a diameter of 50 mm and a length of 300 mm was produced. On the other hand, 3 parts by weight of methyl cellulose and 23 parts by weight of water were mixed into 100 parts by weight of alumina raw material powder having the average particle diameter of 100 parts by weight, and a kneaded product was formulated by placing it in a kneader and kneading it. A tubular body B having the diameter of 50 mm and a length of 300 mm was produced through placing the kneaded product in the vacuum pug mill.

(1-0036)

(Molding Step)

Next, using the bodies A and B, a molded body of a filter was produced by simultaneously extruding them. At that time, an extruding machine having a configuration shown in FIG. 3 was used. That is, the bodies A and B (15A and 15B) were fed into passages 14A and 14B of molding barrels 13A and 13B, respectively. A shaft 11A of a plunger 12A was moved to push the body 15A toward a die 18. Simultaneously with this, a shaft 11B of a plunger 12B was moved to push the body 15B toward the die 18. The die 18 comprised an inlet portion 18a and an outlet portion 18b. In the inlet portion 18a were formed two inlet passages 17A and 17B between which a partition 16 was provided. The cross sectional shape of each inlet passage is circular. The cross sectional shape of an outlet passage 19 in the outlet portion 18b is rectangular. A die cap 20 is arranged at a tip portion of the die 18.

(1-0037)

The extruding speed and the pressure of each of the first and second plungers 12A and 12B are adjusted such that the molded body may not be bent. The thus obtained molded body has a sectional shape as shown in FIG. 1.

(1-0038)
(Firing Step)

Next, the molded body was placed and dried in a thermostat and humidistat container. Then, the molded body was set in an electric furnace where it was heated up to 1500° C. at a heating rate of 200° C./hour and held at 1500° C. for 3 hours. Thereafter, the fired body was left to be cooled down to room temperature, thereby obtaining a sintered laminated body 1 having a tubular shape as shown in FIG. 1. In an outer layer 2 of the fired laminated body 1 are formed a given number of through-holes 4, whereas a given number of through-holes 5 are formed in an inner layer. In a central portion of the inner layer 3 is formed a through-hole 6 having a dimension greater than that of the through-holes 4 and 5. The inner layer 3 was formed of the body 15A, and the outer layer 2 formed of the body 15B.

(1-0039)

The dimension of the cross section of the outer configuration is 30 mm×30 mm, and that of the through-hole 6 is 3 mm×3 mm. The dimension of the through-holes 4, 5 is 1 mm×1 mm. The length of the sintered laminated body is 300 mm. A sample having a dimension of 10 mm×10 mm×1 mm was cut out from each of the outer layer 2 and the inner layer 3, and the porosity of the sample was measured. The porosity of the sample cut out from the inner layer 3 was 45%, and that of the sample cut from the outer layer 2 was 35%. The average pore diameter of the pores in the outer layer 2 was smaller than that of the pores in the inner layer 3 so that finer particles might be removed. A sample was cut out in a length of 50 mm as a filter from the sintered laminated body.

(1-0040)

As shown in FIG. 2, flanges 7 were fitted to both ends of the filter 1, and sealing was effected water-tightly between the ends of the filter and the flanges 7 by means of sealing members 51. The thus assembled filter 1 was fitted into a casing 8 at a given location. By using this filter device, filtering performance was tested. More specifically, a slurry was obtained by suspending alumina powder having the average particle diameter of 1 $\mu$m into water, and flown into the through-holes 6 and 5 as shown by an arrow A through an inlet passage 9A. The slurry was sucked from the outer side of the filter 1. A part of liquid was flown out through an outlet passage 9B as shown in an arrow B, whereas a remainder flowed in a filtrate chamber 10 as shown by arrows C and D. The amount of water filtered was measured at points of times indicated in Table 1d, and measurement results are shown in Table 1.

(1-0041)

When the filter is actually used, the filter is clogged as filtration is effected for a given time. Such clogging can be removed at appropriate times. In the above, data were obtained without removing any clogging. The clogged state may be removed by back washing or by flowing wash water only into the through-holes 6 and 5 via the inlet passage 9A under no sucking at the outer side of the filter 1 so that particles causing the clogging may be discharged through the outlet passage 9B.

(1-0042)

A filter 23 shown in FIG. 4 was produced as a comparative example, and the amount of water filtered was measured in the same manner as mentioned above. In FIG. 4, the filter 23 comprised an outer layer 24 and an inner layer 25, and a through-hole 53 was formed in the inner layer 25. The same bodies A and B as in the above-mentioned example were used for the formation of the outer and inner layers, respectively, and molded into a molded body having a configuration as shown in FIG. 4. Then, the molded body was set in the electric furnace where it was heated up to 1500° C. at a heating rate of 200° C./hour and held at 1500° C. for 3 hours. Then, the fired body was left to be cooled down to room temperature, thereby obtaining a sintered laminated body.

(1-0043)

The dimension of the inner layer 25 of the sintered laminated body was 15 mm×15 mm×300 mm, and that of the outer layer 24 was 30 mm×30 mm×300 mm. The dimension of the through-hole 53 was 3 mm×3 mm. The porosity of the sintered laminated body was 35%. A filter was cut out in a length of 50 mm from this sintered laminated body.

(1-0044)

TABLE 1

| Kind of filter | Treating time period (min.) | Treated amount (cc) |
|---|---|---|
| Example, FIG. 1 | 1 | 200 |
| Example, FIG. 1 | 3 | 600 |
| Example, FIG. 1 | 10 | 1900 |
| Comparative Example, FIG. 4 | 1 | 180 |
| Comparative Example, FIG. 4 | 3 | 400 |
| Comparative Example, FIG. 4 | 10 | 900 |

(1-0045)

As shown in Table 1, according to the present invention, the amount of water filtered can be remarkably increased without deteriorating the function as the filter.

(1-0046)

Figure 5B:
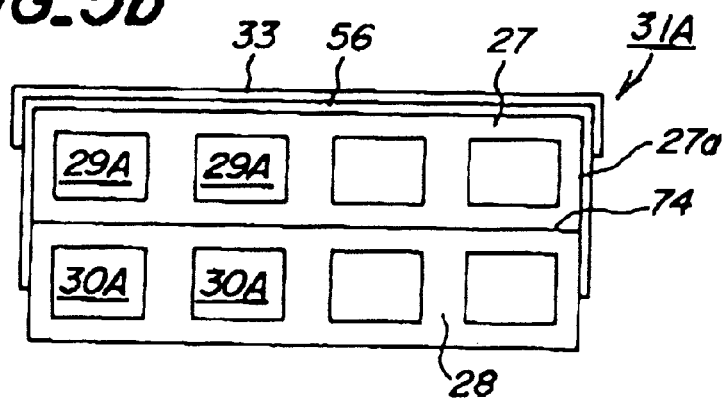

Then, an embodiment of an electrochemical cell to which the present invention is applied will be explained. FIG. 5(a) is a front view for outlining a sintered laminated body 32 for the electrochemical cell according to the present invention. FIG. 5(b) is a front view of illustrating the cell 31A. The sintered laminated body 32 comprises an anode layer 27 and a separator 28. The anode layer 27 is formed with a given number of through-holes 29A, whereas a given number of through-holes 30A are similarly formed in the separator 28. A reference numeral 74 denotes a boundary between the anode layer and the separator.

(1-0047)

A film 56 of a solid electrolyte is formed to cover at least a surfaced 27a of the porous anode layer 27 of the sintered laminated body 32, and a cathode film 33 is formed on the solid electrolyte film 56. In this embodiment, a terminal end portion of the solid electrolyte film 56 contacts an upper end portion of the separator 28 so that one gas (for example, oxidizing gas) through the through-holes 29A, 30A will not directly contact with the other gas (for example, a fuel gas) passing along the outside of the cell 1A.

(1-0048)

An extruding machine as shown in FIG. 3 may be used to produce a molded body for the sintered laminated body in FIG. 5(a).

(1-0049)

Figure 6:
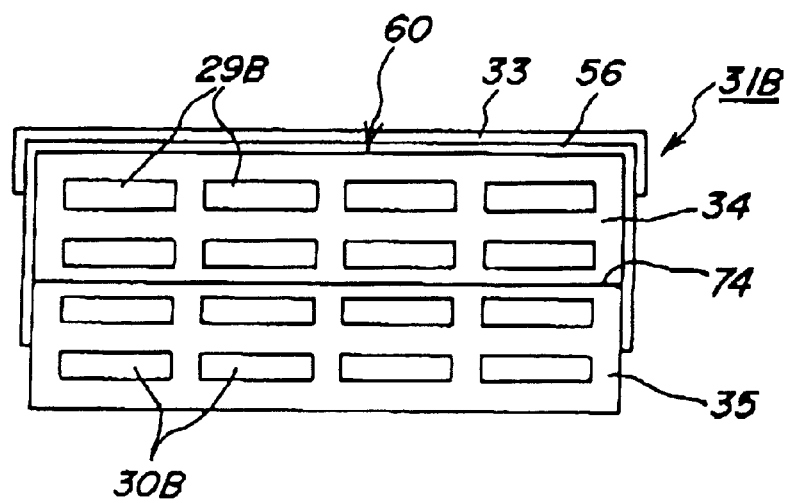
FIG. 6 is a front view for outlining an electrochemical cell 31B as a further embodiment of the present invention.

FIG. 6 is a front view for outlining an electrochemical cell 31B according to another embodiment of the present invention. The sintered laminated body 60 comprises an anode layer 34 and a separator 35. The anode layer 34 are formed with a given number of through-holes 29B in such a manner that the through-holes 29B are arranged in a matrix of 4×2 as viewed in a cross sectional face. Through holes 30B are also formed in the separator 35 in such a manner that the through-holes 30B are arranged in a matrix of 4×2.

(1-0050)

FIGS. 7 and 8 are front views for outlining electrochemical cells 58 and 62 according to further embodiments of the present invention, respectively. In the cell 58 shown in FIG. 7, a sintered laminated body 71 comprises an anode layer 59 and a separator 70. A given number of through-holes 29D are formed in the anode layer 59, whereas through-holes 30D are also formed in the separator 70. For example, three through-holes 61 are formed along a boundary 74 between the anode layer 59 and the separator 70 such that each of the through-holes 61 exists bridging both the anode layer 59 and the separator 70.

(1-0051)

As mentioned above, according to the present invention, through-holes may be provided along the boundary between the separator and the anode layer. The power-generating efficiency, etc. of the anode layer can be improved by flowing an oxidizing gas such as air through these through-holes.

(1-0052)

A film 56 of a solid electrolyte is formed to cover at least a surface 59a of the porous anode layer 59, and a cathode film 33 is formed on the solid electrolyte film 56.

(1-0053)

In the unit cell 62 shown in FIG. 8, the sintered laminated structure 72 comprises an anode 62 and a separator 63. A given number of through-holes 29E are formed in the anode layer 62, whereas the separator 63 is also formed with through-holes 30E. A solid electrolyte film 56 is formed to cover at least a solid electrolyte film 56 to cover at least a surface 62a of the porous anode layer 62 of the sintered laminated structure 72, and a cathode film 33 is formed on the solid electrolyte film 56.

(1-0054)

In this embodiment of the sintered laminated structure 72, the anode layer 62 is thicker than the separator 63, and a number of through-holes 29E are formed in the anode layer 62. In the electrochemical cell, the resistance of the separator is generally greater than that of the anode. For this reason, the entire resistance of the sintered laminated structure 72 is minimized by making the anode layer greater than the separator and thinning the separator having a large resistance.

(1-0055)

FIG. 9(a) is a front view for outlining a sintered laminated structure 36 as a still further embodiment. FIG. 9(b) is a front view for illustrating an electrochemical cell 31C. FIG. 9(c) is a sectional view of the cell 31C cut along a longitudinal direction thereof.

(1-0056)

The sintered laminated structure 36 comprises an anode layer 37 and a separator 38. A given number of through-holes 29C are formed in the anode layer 37, whereas the separator is also formed with through-holes 30C. A solid electrolyte film 56 is formed to cover side faces 37a of the anode layer 37 and upper portions of side faces 38a of the sintered laminated structure 38. A cathode film 33 is formed on the solid electrolyte film 56. Thereby, the cell 31C is formed. As shown in FIG. 9(c), a terminal end of the through-hole 30C of in the separator is communicated with that of the through-hole 29C in the anode layer 37, and the length of the anode layer 37 is smaller than that of the separator 38. The solid electrolyte film 56 covers an entire side face of the anode layer 37 on a terminal end side as viewed in a longitudinal direction as well as upper end portion of a side face 38b of the separator 38 at a terminal end side as viewed in the longitudinal direction.

(1-0057)

In the case of a solid oxide fuel cell, an oxidizing gas is fed into the through-holes 30C of the separator 38 as shown by an arrow E on generating electric power. The oxidizing gas hits upon a terminal wall face of the separator and changes its flowing direction so that the oxidizing gas may enter the through-hole 29C in the air electrode layer 37 and discharged as shown by an arrow F.

(1-0058)

In the following, more concrete experimental results will be described.

EXPERIMENT 1-2

A unit cell for a solid oxide fuel cell as shown in FIG. 5(b) and a unit cell as a comparative example were produced, and each cell was subjected to a power generating test.

(1-0059)

(Production of Bodies for an Air Electrode Layer and a Separator)

A body was formulated by charging a kneader with 100 parts by weight of a powdery raw material for lanthanum manganite having the average particle diameter of 4 $\mu$m, 10 parts by weight of cellulose, 3 parts by weight of methyl cellulose and 18 parts by weight of water. A green body of an air electrode layer having a diameter of 50 mm and a length of 300 mm was produced in a vacuum pug mill by using the above body.

(1-0060)

On the other hand, a body for a separator was formulated by charging a kneader with 100 parts by weight of a powdery raw material for lanthanum chromite having the average particle diameter of 3 $\mu$m, 3 parts by weight of methyl cellulose and 12 parts by weight of water. A green body for the separator having a diameter of 50 mm and a length of 300 mm was produced in the vacuum pug mill by using the above body.

(1-0061)

(Simultaneous Extrusion and Firing)

A molded body having a configuration as shown in FIG. 5(a) was produced by using an extruding machined as shown in FIG. 3. While the speed of each plunger was adjusted, each piston was simultaneously advanced to extruding the body. The thus molded body was placed and dried in a thermostat and humidistat container. Then, the molded body was placed in an electric furance where it was heated up to 1550° C. at a heating rate of 200° C./hour and held at 1550° C. for 4 hours. Then, the fired body was left to be cooled down to room temperature. The fired body had a dimension of 24 mm×8 mm×300 mm with through holes each having a rectangular dimension of 3 mm×4 mm.

(1-0062)

The fired body comprised of an air electrode layer and a separator. A sample of 10 mm×10 mm×1 mm was cut from the fired body and the porosity was measured. As a result, the porosity of the air electrode layer was 35%, whereas that of the separator was 0.3%.
(1-0063)

On the other hand, a sintered laminated structure as a comparative example was produced in the same manner as in the above example, provided that no through-hole was formed in the separator.
(1-0064)

A sample having a dimension of 24 mm×8 mm×50 mm was cut out from each of the above fired bodies as an example of the present invention and the comparative example, and a film of 8 mol yttria-stabilized zirconia (solid electrolyte) was formed in a thickness of 100 $\mu$m on the lanthanum manganite by using a plasma spraying machine. Nickel-zirconia cermet was formed on the stabilized zirconia film by screen printing. The thus obtained assembly was placed in the electric furnace where it was thermally treated at 1400° C. Thereby, unit cells as the example of the present invention and comparative example were obtained.
(1-0065)

(Electric Power-generating Test for Solid Oxide Fuel Cells)

Figure 10:
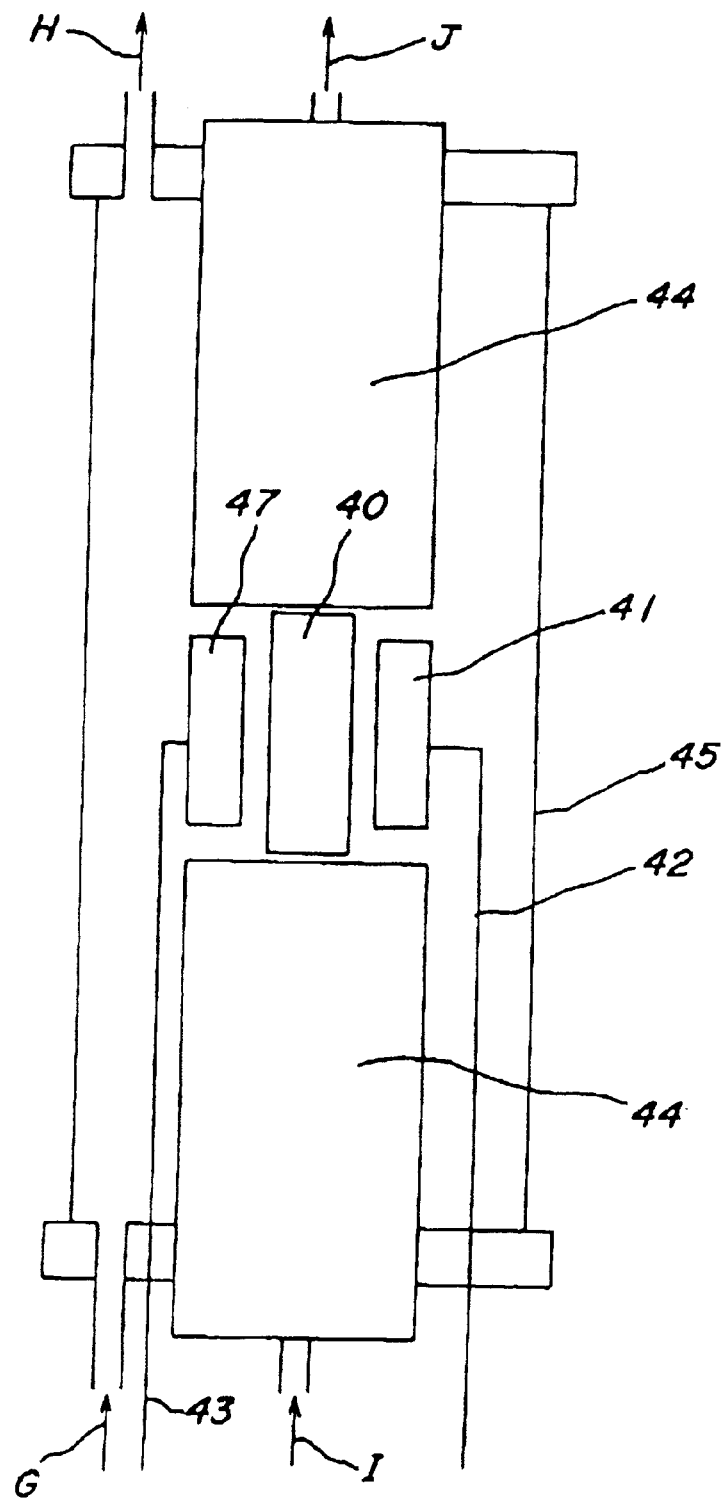
FIG. 10 is a view for schematically illustrating an electric power-generating apparatus or the electrolysis testing apparatus used in experiments of the present invention.
Figure 11:
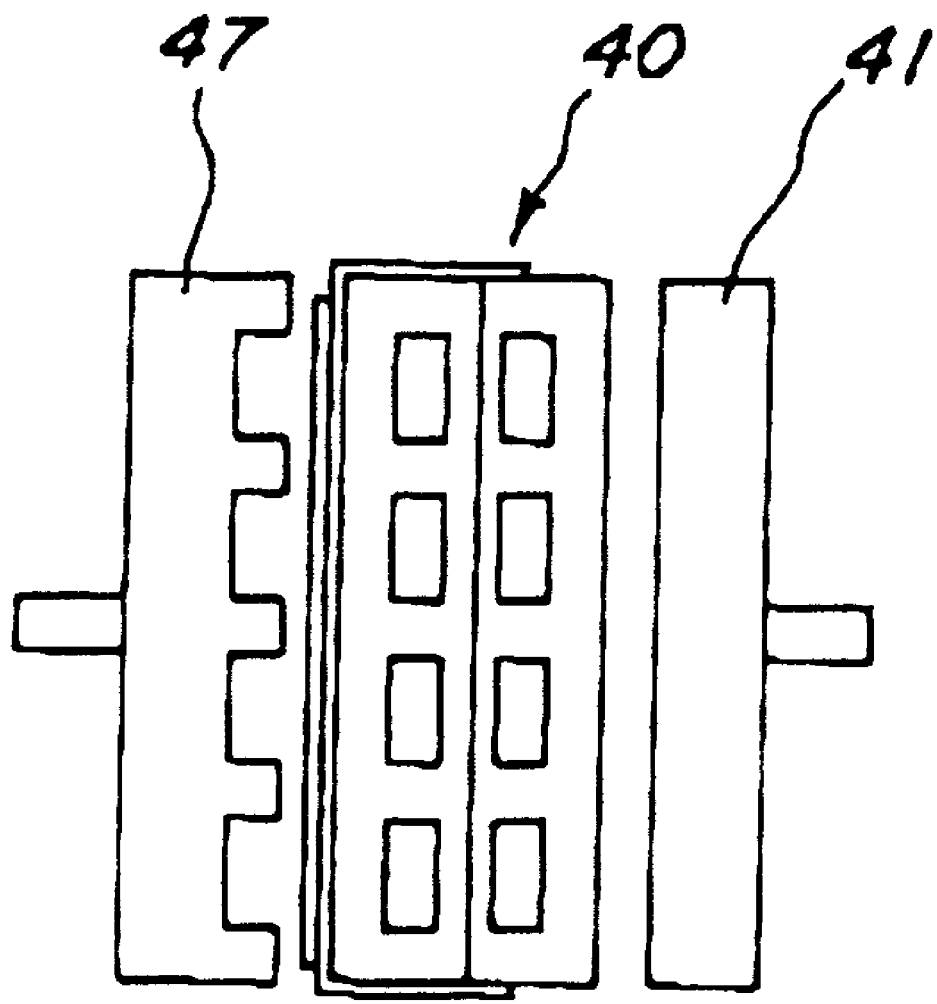
FIG. 11 is a view for illustrating a vicinity of the electrochemical cell in the testing apparatus of FIG. 10 in an enlarged scale.

An electric power-generating test was effected by using an electric power testing apparatus schematically shown in FIGS. 10 and 11. Each cell 40 as an example or a comparative example was set between electricity collectors 41, 47, and platinum wires 42, 43 were connected to respective electricity collectors 41, 47. The assembly was placed in a container 45. Hydrogen was wetted by passing it through a bubbler, fed into the container as shown by an arrow G, contacted with the a fuel electrode, and discharged outside from the container as shown by an arrow H.
(1-0066)

The unit cell 40 was fixed gas-tightly between manifolds 44, so that air is fed through one of the manifolds 44 as shown by an arrow I, and flown through through-holes 29A and 30A, and discharged outside as shown by an arrow J. At that time, in the unit cell 31A as an example of the present invention, air fed into the through-holes 30A of a separator was passed outside while capturing heat generated on generation of electric power and cooling the unit cell. Thereby, the temperature distribution of the unit cell in a longitudinal direction was made uniform.
(1-0067)

It is known that lanthanum chromite used for the separator has higher resistance in a reducing atmosphere such as hydrogen than in air. However, the resistance of the separator could be reduced by providing the through-holes in the separator and feeding air into the through-holes, so that the resistance of the cell itself could be reduced.
(1-0068)

In the present electric power-generating test, since the unit cell only was tested, heat of air having passed the through-holes was not utilized. However, in a practical electric power generator, a number of such unit cells are connected in series. Therefore, air is mixed with excess fuel gas, the mixture is burnt, and the combustion heat can be utilized for heating a reformer or feeding hot water. A nickel plate was used as the electricity collector.
(1-0069)

Further, the unit cell as a comparative example was tested in the same manner as mentioned above. Each of the unit cells as the example of the present invention and the comparative example was used for measuring the maximum output of the unit cell under a electric power generation condition at a temperature of 1000° C. An output density per unit weight is shown in Table 2. From these results, it is seen that if the volumes of the unit cells are equal, the example of the present invention in which the through-holes were provided in the separator had higher output density per unit weight as compared with the comparative example.
(1-0070)

TABLE 2

| | Output density per unit weight |
|---|---|
| Example | 0.18 W/(cm$^2$ · g) |
| Comparative Example | 0.11 W/(cm$^2$ · g) |

(1-0071)

EXPERIMENT 1-3

Unit cell as shown in FIGS. 9(a) to 9(c) was produced, and subjected to the electric power-generating test. This unit cell 31 was produced in the same manner as for the unit cell 31A shown in FIG. 5(b). The unit cell 31C was set in an electric power-generating apparatus, and subjected to the electric power-generating test.
(1-0072)

Figure 12:
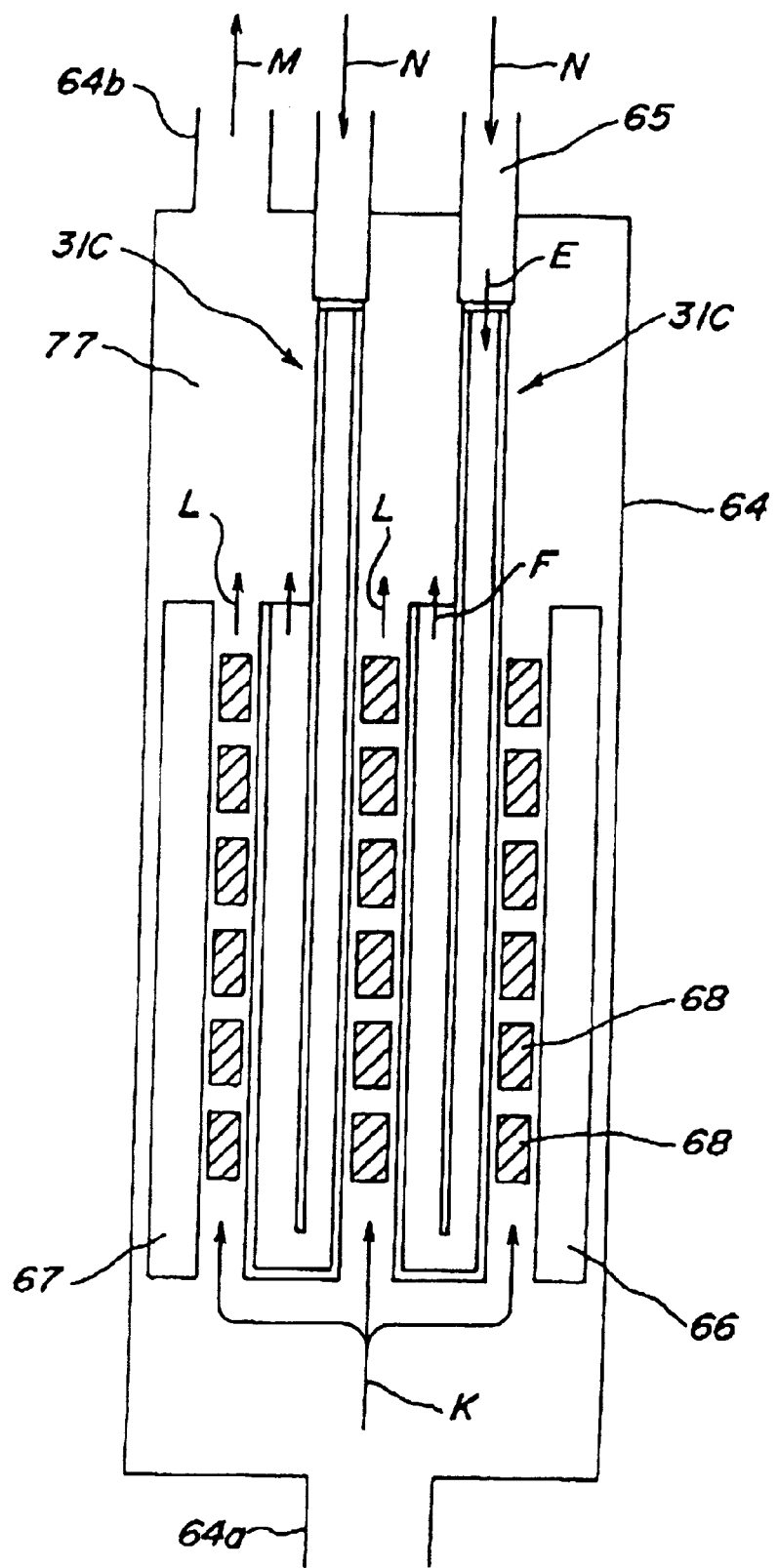
FIG. 12 is a schematic view for outlining an electric power-generating apparatus used for testing the electric power-generating characteristic of the unit cell shown in FIGS. 9(a) to 9(c)

FIG. 12 is a schematic view for outlining this electric power-generating apparatus. Inside a container 64 were set a positive electricity collector plate 66, two unit cells 31C and a negative electricity collector plate 67. Nickel felt pieces 68 were filled between the positive electricity collector plate 66 and the unit cell 31C, between the adjacent unit cells 31 and between the unit cell 31C and the negative electricity collector plate 67, thereby realizing electric connection. A fuel gas feed opening 64a was provided at one end portion of the container, whereas a combustion gas discharge opening 64b was provided at an opposite end portion thereof. Oxidizing gas feed pipes 65 were fitted to a side of the discharge opening 64b such that tips of the feed pipes 65 were gas-tightly attached to ends of the unit cells 31C, respectively.
(1-0073)

Hydrogen was wetted by passing it through a bubbler at room temperature, fed into the container 64 as shown by arrows K, and passed between the adjacent unit cells 31C and between the unit cells 31 and the electricity collector plates 66 and 67 as shown by arrows L. On the other hand, air was flown into the feed pipes 65 as shown by arrows N. flown into through holes 30C of a separator 38 and then through holes 29C of an air electrode layer 37, and discharged outside from the unit cells as shown by arrows F. Used air and hydrogen were reacted within a combustion space 77, and combustion waste gas was discharged through the discharge opening 64b as shown by an arrow M.
(1-0074)

The above electricity-generating test revealed that 0.17 W/(cm$^2$·g) was obtained as an output density per unit weight. Further, while air passed the separators, air cooled the unit cell, and air was preheated. As a result, the temperature distribution of the entire unit cell was made uniform.
(1-0075)

EXPERIMENT 1-4

An experimental example in which the present invention was applied to a steam electrolysis cell will be explained. A steam electrolysis cell as an example having a configuration as shown in FIG. 5(b) and another steam electrolysis cell as a comparative example were produced, and their hydrogen-producing rates per unit weight of the cell were measured.

(1-0076)

A laminated body composed of an anode and a separator was prepared in the same manner as in Experimental 2. The laminated body was dried and fired as in the same manner as in Experiment 2. A sample having a dimension of 10 mm×10 mm×1 mm were cut out from the anode layer and the separator of the fired body, and their porosity was measured. As a result, the porosity of the anode layer was 35%, whereas that of the separator was 0.3%.

(1-0077)

On the other hand, a sintered laminated structure as a comparative example was produced in the same manner as above, provided that no through-hole was formed in the separator.

(1-0078)

A sample having a dimension of 24 mm×8 mm×50 mm was cut out from each of the fired bodies as the example of the present invention and the comparative example, and a film of 8 mol yttria-stabilized zirconia (solid electrolyte) was formed in a thickness of 100 $\mu$m on the lanthanum manganite by using a plasma spraying machine. A platinum paste was printed on this film. The thus obtained assembly was set in the electric furnace where the assembly was thermally heated at 1400° C. By so doing, the steam electrolysis cells as the example of the present invention and comparative example were obtained. The area of the cathode was 8 cm$^2$ in each cell.

(1-0079)

Each of the steam electrolysis cells as the example and the comparative example was set in the test apparatus schematically shown in FIGS. 10 and 11, and subjected to an electrolysis test. Helium gas containing 10% of steam was fed to a side of the cathode at a rate of 500 cc/min, whereas air was fed to a side of the anode at a rate of 200 cc/min.

(1-0080)

Steam was electrolyzed at a current density of 0.3 A/cm$^2$ at 1000° C. An amount of hydrogen generated was measured on an exhaust side of helium gas containing steam by means of gas chromatography, and the amount of hydrogen generated per unit weight of the cell was calculated. As a result, the amount of hydrogen generated was 0.63 cc·min.$^{-1}$·g$^{-1}$ in the steam electrolysis cell as the example of the present invention and 0.39 cc·min.$^{-1}$·g$^{-1}$ in the steam electrolysis cell as the comparative example. As mentioned above, it is understood that the amount of hydrogen generated per unit weight increases, and therefore it is possible to reduce the weight of the cell, when the present invention is applied to the steam electrolysis cell.

(1-0081)

As mentioned above, according to the present invention, the functions possessed by respective ceramics in the sintered laminated functional ceramic structure such as the ceramic filter or the electrochemical cell can be enhanced, and the weight of the sintered laminated structure can be reduced, and structural strength of the sintered laminated structure can be enhanced.

(2-0014)

The sectional shape of each of through-holes provided in the ceramic honeycomb structure is not limited to any specific one, which may be triangular, rectangular, hexagonal or of other polygonal forms. The sectional shapes of the through-holes may be any of the above shapes or a combination thereof. Preferably, the sectional shape of the through-hole is equilateral triangular, regular square, rectangular or regular hexagonal.

(2-0015)

The thickness of the wall of the honeycomb structure to contact the solid electrolyte is not more than 0.5 mm. By so doing, polarization resistance at a portion of the ceramic honeycomb structure contacting the solid electrolyte is conspicuously decreased. From this point of view, the thickness of the above wall is preferably not more than 0.3 mm. In order to support the solid electrolyte, it is preferably that the thickness of the above wall is further preferably not less than 0.1 mm.

(2-0016)

The thickness of those walls of the ceramic honeycomb structure as not contacting the solid electrolyte is not specifically limited. However, from the standpoint of view of lightening the substrate by as much as possible, the thickness of those walls is preferably not more than 1 mm, whereas the thickness is preferably not less than 0.1 mm from the standpoint of increasing the strength.

(2-0017)

In order to enhance the structural strength of the honeycomb structure, both vertical and lateral widths of the sectional face of each of the through-holes are preferably not more than 5 mm, and they are preferably not less than 0.5 mm from the standpoint of easy production.

(2-0018)

Figure 13:
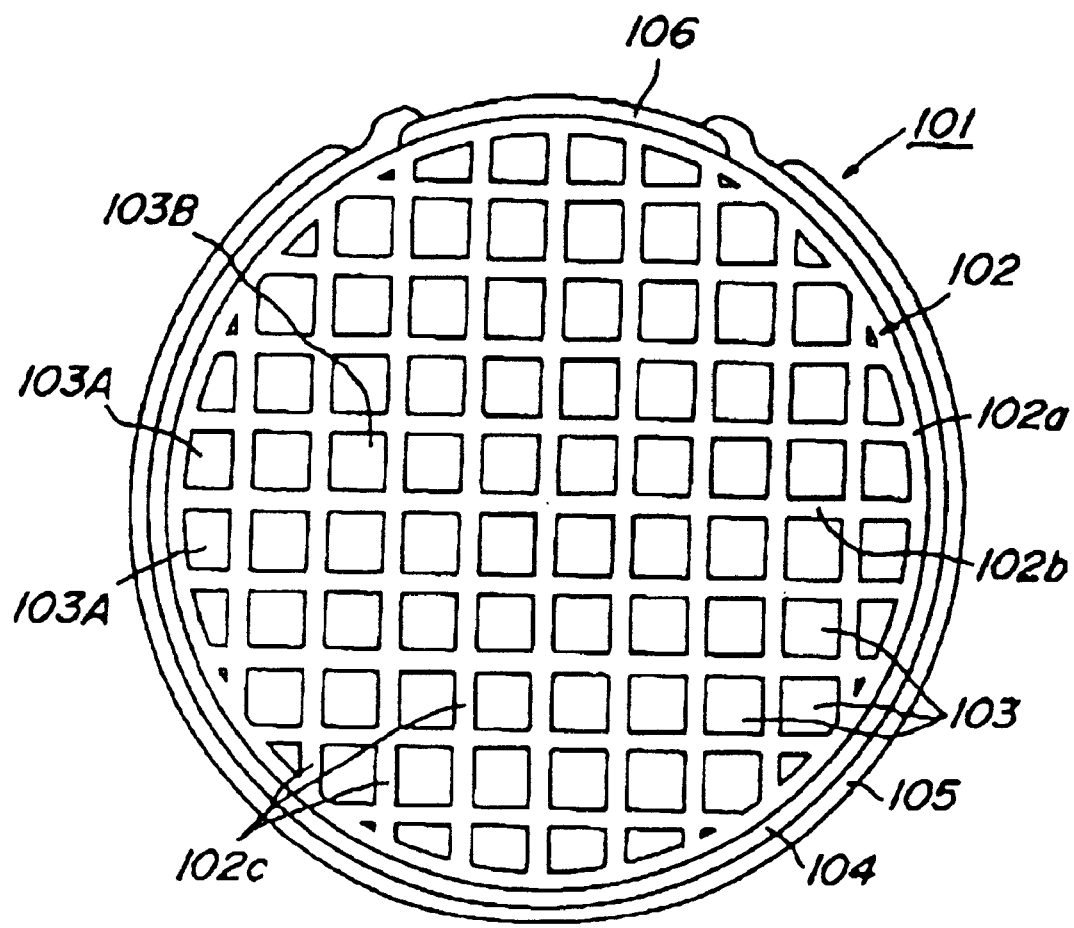
FIG. 13 is a front view for illustrating a tubular according to an embodiment of the second aspect of the present invention.

FIG. 13 is a front view for illustrating an electrochemical cell 101 as an embodiment according to the second aspect of the present invention. A substrate 102 which functions as an electrode is constituted by a ceramic honeycomb structure. The cross sectional shape of the outer peripheral wall 102a of the ceramic honeycomb structure 102 is circular, but it is not specifically limited to a circular form. Inside the wall 102a are provided a number of linear walls extending, for example, vertically or laterally extending in a grid pattern. In FIG. 13, the honeycomb structure includes walls 102c extending in the vertical direction and those 102b extending in the lateral direction. The walls 102b cross those 102c at right angles, and through-holes having a regular square form are formed among these walls.

(2-0019)

A solid electrolyte film 104 is formed on the outer surface of the outer peripheral wall 102a of the ceramic honeycomb structure 102, and a cathode film 105 is formed on the solid electrolyte film 104, provided that no solid electrolyte is not formed on a part of the outer surface of the wall, and instead an interconnector 106 is formed there. End portions of the gas-tight solid electrolyte film 104 continue to those of the interconnector 106 so that a gas flowing inside the through-holes 103 may leak outside the cells 101.

(2-0020)

During actual operation, it may be possible to flow the gas through the through-holes 103A only on an outermost peripheral side but not through those 103B not directly contacting the wall 102a. Alternatively, the gas may be flown simultaneously through the through-holes 103A and 103B.

(2-0021)

In the second aspect of the present invention, the electrode constituting the ceramic honeycomb structure may be an anode or a cathode, but the anode is preferable.

(2-0022)

A main starting material of the anode is preferably a perovskite type complex oxide containing lanthanum, more preferably lanthanum manganite or lanthanum cobaltite, and most preferably lanthanum manganite. Lanthanum manganite may be doped with strontium, calcium, chromium, cobalt, iron, nickel, aluminum or the like.

(2-0023)

A main starting material of the cathode is preferably nickel, nickel oxide, a mixed powder such as nickel-zirconia mixed powder, nickel oxide-zirconia mixed powder, palladium-zirconia mixed powder, platinum-zirconia mixed powder, nickel-ceria, nickel oxide-ceria, palladium-ceria, platinum-ceria, palladium, platinum or the like.
(2-0024)

As the material for the solid electrolyte film, yttria-stabilized zirconia or yttria partially stabilized zirconia is preferred, but other material may be used. Further, in the case of the NOx decomposing cell, the solid electrolyte film is particularly preferably made of cerium oxide-based ceramic.
(2-0025)

As a main starting material for the interconnector, a perovskite type complex oxide containing lanthanum is preferred, and lanthanum chromite is more preferable, because these materials have heat resistance, oxidation resistance, and reduction resistance. Lanthanum chromite may be doped with any of the above mentioned metals.
(2-0026)

In the second aspect of the present invention, the ceramic honeycomb structure to be used as an electrode substrate is produced by extruding a body as a raw material for the above electrode through a die for a molded body of a target honeycomb structure. The body for constituting the molded body of the electrode may be produced by mixing an organic binder, a pore-forming material and water together.
(2-0027)

As the organic binder, polymethyl acrylate, nitrocellulose, polyvinyl alcohol, methyl cellulose, ethyl cellulose, starch, wax, acrylic acid polymer, methacrylic acid polymer, etc. may be recited. As the pore-forming material, cellulose, carbon, acryl powder, etc. may be recited. When the weight of the main raw material is taken as 100 parts by weight, an addition amount of the organic binder is preferably 0.5 to 5 parts by weight, and more preferably 2 to 20 parts by weight.
(2-0028)

When the ceramic honeycomb structure is constituted by one of the electrodes and the interconnector, it is preferable that a molded body is produced by simultaneously feeding the body corresponding to a ceramic layer to constitute one of the electrodes and that corresponding to another ceramic layer to constitute the interconnector through the die, and the ceramic honeycomb structure is produced by firing the resulting molded body.
(2-0029)

In this case, the body to constitute the green molded body for the interconnector may be produced by mixing an organic binder and water into the above main raw material. As the organic binder, polymethyl acrylate, nitrocellulose, polyvinyl alcohol, methyl cellulose, ethyl cellulose, starch, wax, acrylic acid polymer, methacrylic acid polymer, etc. may be recited. When the weight of the main raw material is taken as 100 parts by weight, an addition amount of the organic binder is preferably 0.5 to 5 parts by weight.
(2-0030)

Figure 14:
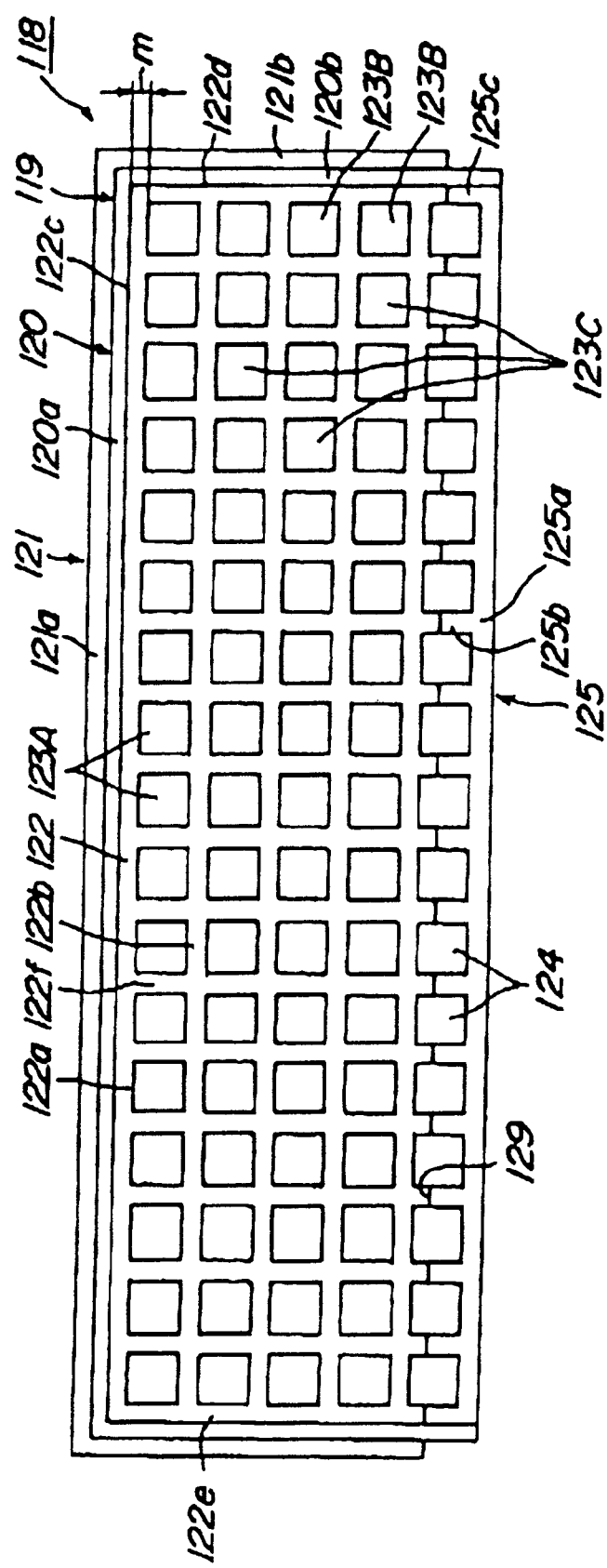
FIG. 14 is a front view for illustrating a unit cell according to another embodiment of the second aspect of the present invention.

FIG. 14 is a sectional view for illustrating an electrochemical cell 118 as another embodiment according to the second aspect of the present invention. A substrate 119 of the cell 118 is constituted by a ceramic honeycomb structure having an almost rectangular sectional shape. The upper portion of the substrate 119 constitutes an anode 122, and an interconnector 125 is joined to an under side of the anode 122 by integral firing. A wall 122a horizontally extends to cover the anode 122, and walls 122e extend vertically from respective terminal ends of the wall 122a, so that the anode 122 is externally defined by the walls 122a and 122e inclusive. The thickness of each of the walls 122a and 122e is not more than 0.5 mm.

(2-0031)

Walls 122b and 122f are laterally and vertically formed in a grid pattern inside the walls 122a and 122e defining the outer periphery of the anode 122. A number of through-holes 123C are formed by the walls 122b and 122f. A line of through-holes 123A are formed between the walls 122a and the adjacent walls 122b. A row of through-holes 123B are formed between each of the walls 122e and the adjacent wall 122f. The through-holes 123A and 123B directly face the walls 122a and 122e defining the outer periphery of the anode 122. The anode 122 itself constitutes a part of the honeycomb structure.
(2-0032)

Walls 125b of the interconnector 125 vertically extend and are joined to lowermost portions of the walls 122f of the anode 122, respectively, while the walls 125b continue to a wall 125a defining an outer end of the interconnector 125. A reference numeral 129 denotes a joint between the anode and the interconnector. Through-holes 124 are formed by the walls 122b, 122f, 122b and 125a, and face the anode and the interconnector.
(2-0033)

A horizontal portion 120a of a solid electrolyte film 120 is formed on the surface 122c of the wall 122a of the anode 122, and a vertical portion 120b of the solid electrolyte film 120 is formed on a surface 122d of each of the walls 122e. An under end of each vertical portion 120b of the solid electrolyte film 120 extends down to the surface 125c of the interconnector 125. The solid electrolyte film 120a, 120b keeps the through-holes 123A, 123B and 123C, 124 inside the ceramic honeycomb structure 119 gas-tight. A horizontal portion 121a of a cathode film 121 is formed on that 120a of the solid electrolyte film 120, and a vertical portion 121b of the cathode film 121 is formed on each of the vertical portions 120b of the solid electrolyte film 120.
(2-0034)

Electromotive forces are simultaneously generated in the entire solid electrolyte film 120a, 120b by flowing an oxidizing gas through at least the through-holes 123A, 123B on generating electric power.
(2-0035)

As a solid oxide fuel cell, the oxidizing gas may be also flown through the through-holes 123C and 124. In this case, the oxidizing gas flowing the through-holes 123C and 124 goes outside the unit cell, while capturing the heat produced on power generation, so that the unit cell is cooled. Thereby, the temperature distribution of the unit cell as viewed in a longitudinal direction can be made uniform.
(2-0036)

It is known that lanthanum chromite which is generally used as a material for the interconnector has a lower resistance in an oxidizing atmosphere than in a reducing atmosphere. In the present embodiment, if the interconnector 125 is made of lanthanum chromite, the oxidizing gas may be fed through the through-holes 124, too. By so doing, since the oxidizing gas can be fed into the through-holes 124, the resistance of the interconnector 125 can be accordingly reduced and the thickness of the interconnector 125 can be reduced, the resistance of the interconnector can be further decreased. Thereby, the internal resistance of the cell can be further reduced.
(2-0037)

In the second aspect of the present invention, for example, the ceramic honeycomb substrate having the structure in which the electrode and the interconnector are integrated as shown in FIG. 14, is particularly preferably used. For, the substrate of such a structure has a crossbeam structure, and therefore its structural strength is high.

(2-0038)

Further, the sectional shape of the electrochemical cell is preferably rectangular as shown in FIG. 14. For example, in the case of the solid oxide fuel cell, while a fuel gas flows outside the unit cell. If the sectional shape of the unit cell is circular as shown in FIG. 13, the fuel gas also flows in an unnecessary portion not participating in the reaction. To the contrary, if the sectional shape of the electrochemical cell is rectangular, such a dead space is small, so that the fuel-utilizing efficiency is improved.

(2-0039)

EXPERIMENTS

In the following, more specific experimental results of the second aspect of the present invention will be described.

Experiment A (Production of a Unit Cell as Example 2-1)

A body was formulated by charging 100 parts by weight of a raw material powder for lanthanum manganite having the average particle diameter of 3 $\mu$m, 5 parts by weight of cellulose, 3 parts by weight of methyl cellulose and 12 parts by weight of water into a kneader, and kneading the mixture. This body was molded into a molded body having a tubular shape of 50 mm in diameter and 300 mm in length by using the vacuum pug mill. To a cylinder of an extruder was attached a die for the formation of a honeycomb structure. The molded body was placed in the cylinder, and a piston was advanced in the cylinder to extrude the body. Thereby, a ceramic honeycomb structure having a structure as shown in FIG. 13 was produced. This molded body had an outer shape of 18 mm in diameter and 500 mm in length, and through-holes each had an almost square cross sectional shape with walls being 0.6 mm in thickness over the entirety of the molded body. The vertical and lateral widths of each through-hole were 0.6 mm, and the pitch of the through-holes was 1.2 mm.

(2-0040)

The molded body was dried at 100° C. by using a dryer, then heated up to 1600° C. at a heating rate of 100° C. in an electric furnace, and fired at 1600° C. for 3 hours, thereby obtaining a ceramic honeycomb structure 101. This structure had an outer shape of 15 mm in diameter and 300 mm in length, and through-holes each had an almost square cross sectional shape with walls being 0.6 mm in thickness over the entirety of the fired body. The vertical and lateral widths of each through-hole were 0.5 mm, and the pitch of the through-holes was 1.0 mm.

(2-0041)

Thereafter, a portion of the outer peripheral surface of the resulting ceramic honeycomb structure 101 to be formed with no interconnector film was masked with a heat-resistive tape, and a film of an interconnector was formed on the remainder of the outer peripheral surface by using a plasma sprayer. In this case, lanthanum chromite powder having the average particle diameter of 35 $\mu$m was melted in a plasma gas of argon and hydrogen, and the interconnector film was formed in a thickness of 150 $\mu$m on the honeycomb structure under an output of 40 kw. Then, the mask was peeled off.

(2-0042)

Then, a film of a solid electrolyte was formed by using the plasma sprayer. First, a portion of the resulting ceramic honeycomb structure to be formed with no solid electrolyte film was masked with a heat-resistive tape. A 9 mol % yttria stabilized zirconia powder having the average particle diameter of 25 $\mu$m was melted in the plasma gas of argon and hydrogen, and the solid electrolyte film was formed in a thickness of 100 $\mu$m on the honeycomb structure under an output of 40 kw. Then, the mask was peeled off. In order to make dense the interconnector and the solid electrolyte, the entire structure was heated at 1450° C. for 3 hours in air inside the electric furnace.

(2-0043)

Next, a fuel electrode was formed on the solid electrolyte by screen printing. A paste was formulated by mixing NiO powder, yttria stabilized zirconia powder and polyethylene glycol at such a ratio as to give a volumeric percentage of nickel being 60 vol. %. A film of this paste was formed on the solid electrolyte film by a screen printer for tubular bodies. The thickness of the paste film was 100 $\mu$m. Then, the entire structure was placed in the electric furnace where the fuel electrode film was formed of a nickel-zirconia cermet by firing the structure at 1400° C. for 2 hours. Thereby, a unit cell in Example 2-1 was produced.

(2-0044)

(Production of Unit Cells in Examples 2-2 and 2-3)

In order to examining an effect of the thickness of walls of the ceramic honeycomb structure, unit cells in Examples 2-2 and 2-3 were produced in the same manner as in above Example 2-1. In Example 2-2, the thickness of the walls of the fired structure was 0.1 mm, and that of the walls of the fired structure in Example 2-3 was 0.2 mm.

(2-0045)

(Comparative Example 2-1)

A unit cell was produced in the same manner as in Example 2-1, provided that a tubular substrate was produced as an air electrode substrate. A die cap for the formation of a tubular body was attached to an extruder, and a molded body was then placed in the extruding apparatus. The piston was advanced to obtain a tubular molded body having a configuration of 18 mm in diameter, 2.4 mm in thickness and 500 mm in length. A tubular air electrode substrate pipe was produced by firing the molded body in the same manner as in Example 2-1. The fired body had a configuration of 15 mm in diameter, 2.0 mm in thickness and 300 mm in length.

(2-0046)

(Electric Power Generating Test for the Solid Oxide Fuel Cells)

Figure 15:
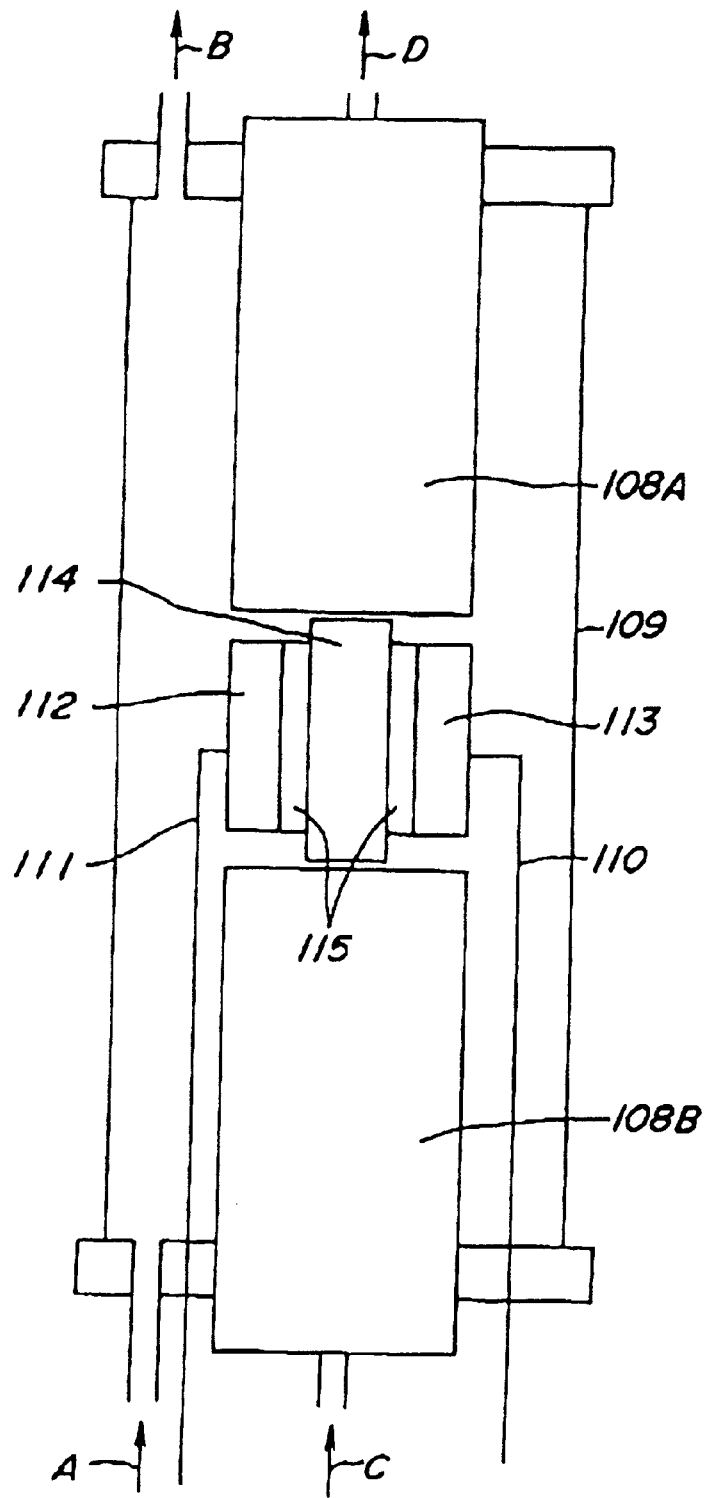
FIG. 15 is a schematic view for illustrating an apparatus used to test solid oxide fuel cells as viewed in a longitudinal direction.
Figure 16:
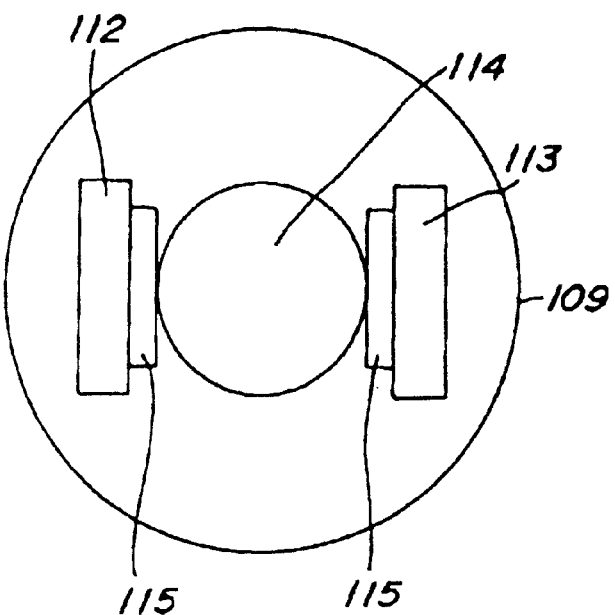
FIG. 16 is a schematic view of the apparatus as viewed in a widthwise direction.

An electric power generating test was effected by using an electric power testing apparatus schematically shown in FIGS. 15 and 16. Each of the unit cells 140 in Examples and Comparative Examples was placed between electricity collectors 112 and 113, and platinum wires 110, 111 were connected to respective electricity collectors. As the electricity collectors 112, 113, nickel plates were used. Nickel felts 115 were interposed between each of the electricity collectors 112, 113 and the unit cells 114. The resulting assembly was placed in a container 109. Hydrogen was wetted by passing it through a bubbler at room temperature, fed into the vessel as shown by an arrow A, contacted with the fuel electrode of the unit cell 114 and discharged outside the container 109 as shown by an arrow B.

(2-0047)

The unit cell 114 was gas-tightly fixed to ceramic manifolds 8A and 8B. Air was fed through the manifold 8B as shown by an arrow C, contacted with the fuel electrode of the unit electrode 114, flown in the unit cell, and discharged outside the container as shown by an arrow D.

(2-0048)

A polarized value of each unit cell was measured by a current shield method under an electric power generating condition at a temperature of 1000° C. The density of electric current used was 300 mA/cm$^2$ (unit area of the electrode). Measurement results are shown in Table 3.

(2-0049)

TABLE 3

|  | Shape of air electrode substrate | Thickness of wall of honeycomb structure or thickness of tubular substrate | Polarized value η at 0.3 A/cm² (mV) |
| --- | --- | --- | --- |
| Example 2-1 | FIG. 1 | 0.5 mm | 70 |
| Example 2-2 | FIG. 1 | 0.1 mm | 30 |
| Example 2-3 | FIG. 1 | 0.2 mm | 35 |
| Comparative Example 2-1 | tubular | 2 mm | 250 |

(2-0050)
As is seen from Table 3, the unit cell according to the second aspect of the present invention has an extremely smaller polarized value as compared with those in Comparative Examples. Further, the polarized value was extremely reduced by reducing the thickness of the walls to not more than 0.5 mm.
(2-0051)

Experiment B
(Production of unit cells in Examples 2-4, 2-5 and 2-6)

A body was formulated by charging 100 parts by weight of a raw material powder for lanthanum manganite having the average particle diameter of 3 μm, 5 parts by weight of cellulose, 3 parts by weight of methyl cellulose and 14 parts by weight of water into a kneader, and kneading the mixture. This body was molded into a molded body having a tubular shape of 50 mm in diameter and 300 mm in length. On the other hand, another body was formulated by charging 100 parts by weight of a raw material powder for lanthanum chromite having the average particle diameter of 3 μm, 3 parts by weight of methyl cellulose and 14 parts by weight of water into the kneader, and kneading the mixture. This body was molded into a molded body having a tubular shape of 50 mm in diameter and 300 mm in length.
(2-0052)

Figure 17:
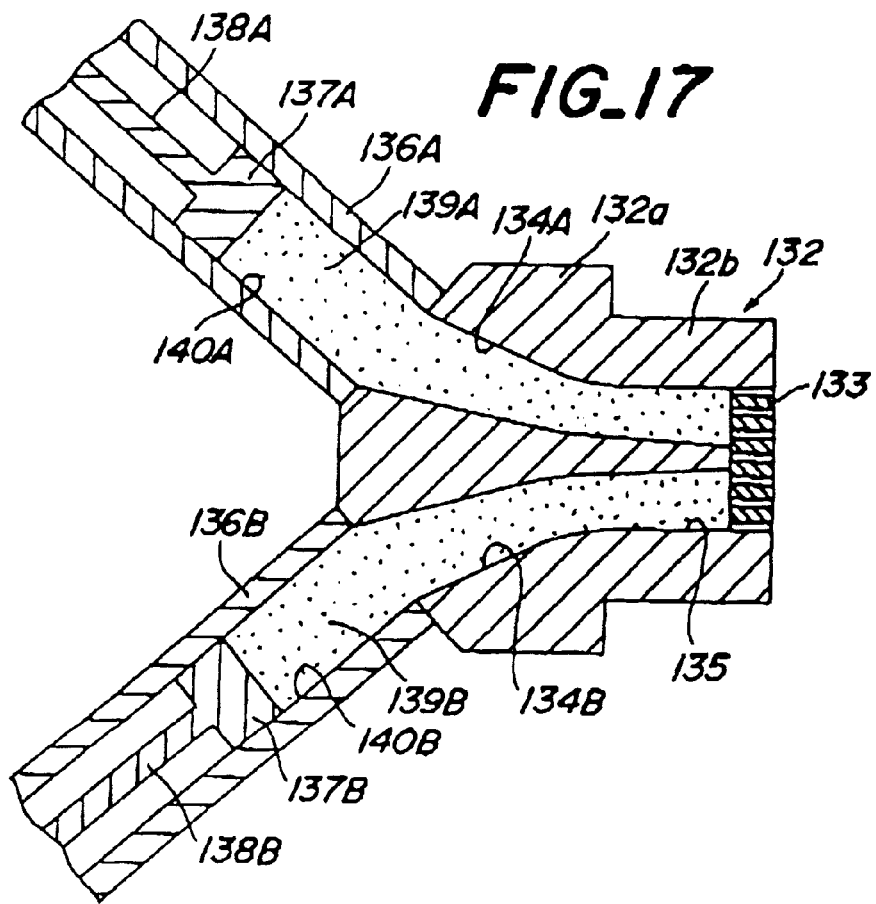
FIG. 17 is a sectional view for schematically illustrating an extruding apparatus to be favorably used in producing the substrate as shown in FIG. 14.

A molded body for a substrate 119 was formed by using and simultaneously extruding the above molded bodies. At that time, an extruding machine as designed in FIG. 17 was used. That is, the body 139A for an air electrode and the body 139B for an interconnector were fed into passages 140A and 140B of respective molding barrels 136A and 136B. A shaft 138A of a plunger 137A was moved to push the air electrode body 139A toward a die 132, whereas a shaft 138B for a plunger 137B was simultaneously moved to push the body 139B toward the die 132. The die 132 comprises an inlet portion 132a and an outlet portion 132b. The inlet portion 132a is provided with two inlet passages 134A and 134B, and a partition is provided between the inlet passages 134A and 134B. The cross sectional shape of each inlet passage is circular. The cross sectional shape of the outlet passage 135 in the outlet portion 132b is rectangular. A die cap 133 is arranged at a tip of the die 132.
(2-0053)

The extruding speed and the pressure of each of the first and second plungers 137A and 137B were so adjusted that the molded body might not be bent. The thus obtained molded body had a sectional shape corresponding to the configuration of the substrate 119 in FIG. 14. This molded body was dried at 100° C. by using the dryer, then heated up to 1600° C. at a heating rate of 100° C./hour in the electric furnace, and fired at 1600° C. for 3 hours, thereby obtaining the substrate 119. This substrate 119 had a dimension of about 6 mm in vertical width, about 20 mm in lateral width and about 300 mm in length.

(2-0054)
Thereafter, a portion of the outer peripheral surface of the resulting ceramic honeycomb structure to be formed with no electrolyte film was masked with a heat-resistive tape, and a sprayed film was formed in a thickness of 60 μm on the remainder of the outer peripheral surface by spraying 8 mol % yttria stabilized zirconia powder as a solid electrolyte by means of the plasma sprayer so that the entire surface of the air electrode might be covered with the solid electrolyte. The thus obtained structure was entirely placed in the electric furnace where the sprayed film was made dense by heating the structure at 1400° C. for 4 hours. Then, a portion of the structure to be formed with no fuel electrode film was masked with a heat-resistive tape, and a fuel electrode film was formed by plasma spraying a mixed powder composed of 50 wt % of nickel oxide and 50 wt % of 8 mol % yttria stabilized zirconia upon the solid electrolyte film at an output of 40 kw.
(2-0055)

In the above, the thickness of the walls of the honeycomb structure contacting the solid electrolyte film was varied by changing the configuration of the die cap as shown in Table 4.
(2-0056)
(Production of a Unit Cell in Comparative Example 2-2)

Figure 18:
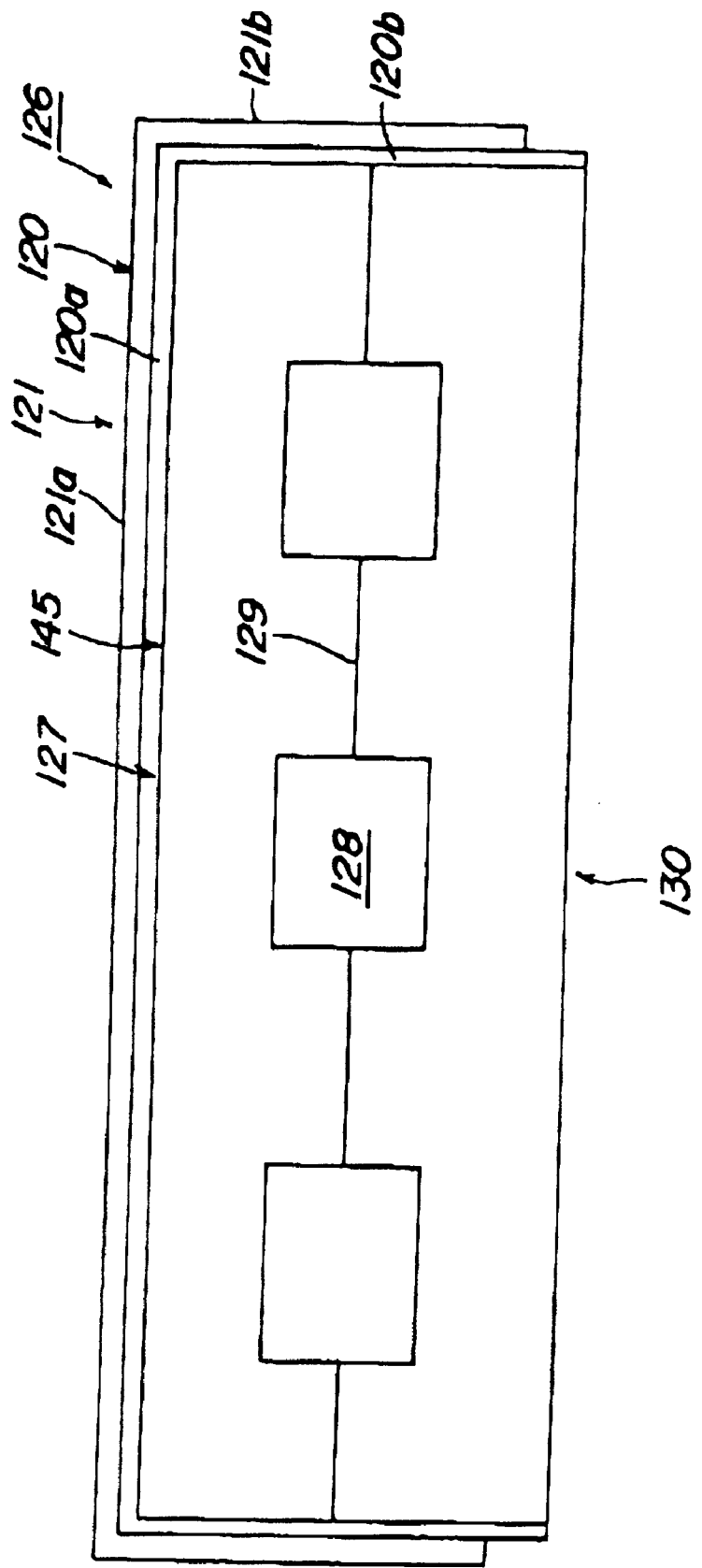
FIG. 18 is a front view of a unit cell produced as a comparative example.

A unit cell in Comparative Example 2-2 was produced in the same manner as in Example 2-4. In this case, the unit cell 126 having a structure shown in FIG. 18 was produced by changing the shape of the die cap. With respect to the same constituent elements as shown in FIG. 15, same reference numerals are given to them, and explanation thereof is omitted. The cross sectional shape of a substrate 145 of the unit cell 126 is almost rectangular, and an upper portion of the substrate 145 is constituted by an air electrode 127, and an interconnector 130 is joined to the under side of the air electrode 127 by integral firing. A plurality of through-holes 128 are formed bridging the air electrode 127 and the interconnector 130. Each through-hole 128 faces both the air electrode 127 and the interconnector 130.
(2-0057)
(Measurement of Electric Power-generating Performance)

With respect to unit cells in Examples 2-4, 2-5 and 2-6 and Comparative Example 2-2, the output density per unit weight was measured, and measurement results are shown in Table 4.
(2-0058)

TABLE 4

|  | Shape of substrate | Thickness of walls of air electrode contacting solid electrolyte | Output density per unit weight (W/g) |
| --- | --- | --- | --- |
| Example 2-4 | FIG. 2 | 0.5 mm | 0.55 |
| Example 2-5 | FIG. 2 | 0.3 mm | 0.81 |
| Example 2-6 | FIG. 2 | 0.1 mm | 0.82 |
| Comparative Example 2-2 | FIG. 6 | 2 mm | 0.27 |

(2-0059)
As is seen from the results in Table 4, when the substrate was made as the honeycomb structure according to the second aspect of the present invention, the output density per unit weight of the unit cell remarkably increased. This is because the polarized value is small as the walls of the air electrode can be thinned. Further, since the substrate was made in a form of the honeycomb structure, the substrate has sufficient strength as the structure for the solid oxide fuel cell.

(2-0060)

Experiment C

A high temperature steam electrolysis cell according to an embodiment of the second aspect of the present invention having the configuration of FIG. 14 was produced in the same manner as in Examples 2-4, 2-5 and 2-6, provided that the thickness of walls contacting a solid electrolyte film was 0.3 mm. Further, a high temperature steam electrolyte cell according to a comparative example having the structure shown in FIG. 18 was produced as in Comparative Example 2-2.

(2-0061)

Steam was electrolyzed at 1000° C. in the electric furnace by using each of the high temperature steam electrolysis cells according to the invention example and the comparative example. To a side of a cathode (nickel-zirconia cermet) was fed 5.6% $H_2O$ by employing helium containing 0.5% of hydrogen as a carrier gas, whereas air was fed to a side of an anode (lanthanum manganite). At that time, an end portion of the cell was sealed to a gas feed manifold with glass so that the gas on the cathode side might not be mixed with that on the anode side. The relationship between the voltage and the density of the electric current was measured, and results are shown in FIG. 19.

(0062)

As is seen from the above results, even if the voltage is equal, the invention example has a higher electric current density and a higher electrolysis efficiency. This is considered that since the thickness of the anode facing the solid electrolyte can be thinned, oxygen generated in the anode can be smoothly removed.

What is claimed is:

1. A sintered laminated structure, comprising:
   a plurality of layers wherein each layer comprises a ceramic material different from the material of another layer; and
   each of said layers having a hole extending therethrough;
   wherein the hole through one layer is independent from the hole through another layer of the structure.

2. The sintered laminated structure of claim 1, wherein a first of said layers comprises an electrode layer and a second of said layers comprises a separator layer.

3. The sintered laminated structure of claim 1, wherein the laminated structure comprises a generally planar configuration.

4. The sintered laminated structure set forth in claim 1, wherein the laminated structure comprises a ceramic filter.

5. The sintered laminated structure of claim 1, wherein one of said layers comprises an outer layer comprising a material selected from the group consisting of silica, alumina, mullite, zirconia, spinel, silicon carbide, and cordierite.

6. The sintered laminated structure of claim 5, wherein said outer layer comprises an average pore diameter of about 1 to 10 $\mu$m.

7. The sintered laminated structure of claim 5, wherein said outer layer comprises a porosity of about 10 to 70%.

8. The sintered laminated structure of claim 1, wherein one of said layers comprises an inner layer comprising a material selected from the group consisting of silica, alumina, mullite, zirconia, spinel, silicon carbide, and cordierite.

9. The sintered laminated structure of claim 8, wherein said inner layer comprises an average pore diameter of about 5 to 200 $\mu$m.

10. The sintered laminated structure of claim 8, wherein said inner layer comprises a porosity of about 20 to 80%.

11. The sintered laminated structure of claim 1, wherein a first of said layers comprises an outer layer and a second of said layers comprises an inner layer.

12. The sintered laminated structure of claim 11, wherein said outer layer has a plurality of holes extending therethrough.

13. The sintered laminated structure of claim 11, wherein said inner layer has a first set plurality of holes extending therethrough.

14. The sintered laminated structure of claim 13, wherein said inner layer includes a second hole extending generally along the central longitudinal axis thereof.

15. The sintered laminated structure of claim 14, wherein said second hole is larger than one of the holes of said first set.

16. An electrochemical cell, comprising:
   a sintered laminated structure comprising a plurality of layers wherein each layer comprises a ceramic material different from the material of another layer, each of said layers having a hole extending therethrough, wherein the hole through one layer is independent from the hole through another layer; and
   an electrolyte film on one of said layers.

17. The electrochemical cell of claim 16, wherein:
   a first of said layers comprises an electrode layer and a second of said layers comprises a separator layer; and
   aid electrolyte film is on said electrode layer.

18. The electrochemical cell of claim 17, wherein said electrolyte film covers substantially the entirety of said electrode layer.

19. The electrochemical cell of claim 17, wherein:
   said electrode layer comprises a first electrode; and
   a second electrode opposite said first electrode is located on said electrolyte film.

* * * * *